United States Patent
Islam et al.

(10) Patent No.: US 10,693,605 B2
(45) Date of Patent: Jun. 23, 2020

(54) RACH TRANSMISSION USING MULTIPLE PORTS

(71) Applicant: QUALCOMM Incorporated, San Diego, CA (US)

(72) Inventors: Muhammad Nazmul Islam, Edison, NJ (US); Navid Abedini, Raritan, NJ (US); Bilal Sadiq, Basking Ridge, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/690,820

(22) Filed: Aug. 30, 2017

(65) Prior Publication Data

US 2018/0097591 A1    Apr. 5, 2018

Related U.S. Application Data

(60) Provisional application No. 62/473,844, filed on Mar. 20, 2017, provisional application No. 62/402,892, filed on Sep. 30, 2016.

(51) Int. Cl.
*H04W 74/08* (2009.01)
*H04L 5/00* (2006.01)
(Continued)

(52) U.S. Cl.
CPC .......... *H04L 5/0023* (2013.01); *H04L 5/0048* (2013.01); *H04W 72/005* (2013.01);
(Continued)

(58) Field of Classification Search
CPC .. H04L 5/0023; H04L 5/0048; H04W 72/005; H04W 72/0446; H04W 74/0833
See application file for complete search history.

(56) References Cited

U.S. PATENT DOCUMENTS

2010/0067452 A1* 3/2010 Fischer ................. H04L 5/0007
                                                    370/329
2012/0314664 A1* 12/2012 Johansson ......... H04W 74/0833
                                                    370/329
(Continued)

FOREIGN PATENT DOCUMENTS

WO    WO-2007145488 A2    12/2007
WO    WO-2012082053 A1    6/2012

OTHER PUBLICATIONS

International Search Report and Written Opinion—PCT/US2017/049672—ISA/EPO—dated Nov. 23, 2017.
(Continued)

*Primary Examiner* — Lakeram Jangbahadur
(74) *Attorney, Agent, or Firm* — Haynes and Boone, LLP

(57) ABSTRACT

A RACH preamble is transmitted from a UE using multiple antenna ports. A UE splits a data stream containing a RACH preamble into multiple streams corresponding to a same number of antenna ports of the UE. The UE multiplexes the copies of the RACH preamble according to a multiplexing scheme that enables a receiving eNB to discern the different channels used to transmit the signal from the different antenna ports. A RACH procedure is further accomplished in two steps instead of four by the UE then splitting a RACH payload to the same number of streams and multiplexing the RACH payload for transmission to the eNB. The eNB receives both transmissions, and may use the RACH preamble as a reference signal, and responds with a combined message with control information, random access response, and contention resolution information.

30 Claims, 9 Drawing Sheets

(51) Int. Cl.
*H04W 72/00* (2009.01)
*H04W 72/04* (2009.01)
(52) U.S. Cl.
CPC ... *H04W 72/0446* (2013.01); *H04W 74/0833* (2013.01); *H04W 72/046* (2013.01); *H04W 72/0453* (2013.01)

(56) References Cited

U.S. PATENT DOCUMENTS

| | | | | |
|---|---|---|---|---|
| 2013/0083753 | A1* | 4/2013 | Lee | H04W 72/0453 370/329 |
| 2013/0336266 | A1* | 12/2013 | Fischer | H04L 5/0007 370/329 |
| 2014/0016573 | A1* | 1/2014 | Nuggehalli | H01Q 1/242 370/329 |
| 2016/0119038 | A1* | 4/2016 | Thomas | H04B 7/043 370/329 |

OTHER PUBLICATIONS

Motorola: "Random Access Payload Size", 3GPP Draft; R1-061166_RA_PAYLOADSIZE, 3rd Generation Partnership Project (3GPP), Mobile Competence Centre; 650, Route Des Lucioles; F-06921 Sophia-Antipolis Cedex; France; vol. RAN WG1, No. Shanghai, China; May 2, 2006, XP050102053, [retrieved on May 2, 2006], 4 pages.

* cited by examiner

RACH TRANSMISSION USING MULTIPLE PORTS

CROSS REFERENCE TO RELATED APPLICATIONS

The present application claims priority to and the benefit of the U.S. Provisional Patent Application No. 62/402,892, filed Sep. 30, 2016, and U.S. Provisional Patent Application No. 62/473,844, filed Mar. 20, 2017, each of which is hereby incorporated by reference in its entirety as if fully set forth below in its entirety and for all applicable purposes.

TECHNICAL FIELD

Aspects of the present disclosure relate generally to wireless communication systems, and more particularly, to transmitting random access signals (e.g., RACH preamble and payload) using multiple antenna ports in a reduced amount of time.

INTRODUCTION

In wireless communication networks, when UEs are attempting to access an evolved node B (eNB) (whether initial access, uplink data during connection, or handover), they generate and send random access channel (RACH) preambles according to a random access procedure. Following a response from an eNB, UEs then generate and send RACH payloads and the eNB responds to complete the procedure. Typically, this is done using only one antenna port at the UE.

This RACH procedure, also referred to at times as a four-step RACH procedure, takes up time as the UE transmits the RACH preamble, waits for the response, transmits the RACH payload, and then waits for yet another response. This introduces inefficiencies of resource utilization at least with respect to time. Further, under this or alternative approaches, the RACH communications from the UE are still done using only one antenna port at the UE.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method is provided that includes providing, by a first wireless communications device, a random access signal to a first antenna port of the first wireless communications device for transmission to a second wireless communications device. The method further includes providing, by the first wireless communications device, the random access signal to a second antenna port of the first wireless communications device for transmission to the second wireless communications device. The method further includes transmitting, by the first wireless communications device, the random access signal provided to the first and second antenna ports to the second wireless communications device.

In an additional aspect of the disclosure, a method is provided that includes receiving, at a first wireless communications device, a random access signal from a second wireless communications device, wherein the random access signal was split into first and second antenna ports. The method further includes correlating, by the first wireless communications device, a first stream corresponding to the first antenna port and a second stream corresponding to the second antenna port. The method further includes determining, by the first wireless communications device, an identity of the second wireless communications device based on a result of the correlating.

In another aspect of the disclosure, a method is provided that includes providing, by a first wireless communications device, a random access channel (RACH) preamble to a first antenna port of the first wireless communications device and to a second antenna port of the first wireless communications device. The method further includes providing, by the first wireless communications device, a RACH payload to the first antenna port and to the second antenna port. The method further includes transmitting, by the first wireless communications device, the RACH preamble and the RACH payload as provided to the first and second antenna ports to a second wireless communications device.

In an additional aspect of the disclosure, a method is provided that includes receiving, at a first wireless communications device, a random access channel (RACH) preamble from a second wireless communications device, wherein the RACH preamble was split into first and second antenna ports. The method further includes receiving, at the first wireless communications device, a RACH payload from the second wireless communications device, wherein the RACH payload was split into the first and second antenna ports. The method further includes recovering, by the first wireless communications device, first and second data streams corresponding to the first and second antenna ports for the RACH preamble and third and fourth data streams corresponding to the first and second antenna ports for the RACH payload. The method further includes determining, by the first wireless communications device, an identity of the second wireless communications device and a response message based on the recovering the first and second, and third and fourth, data streams.

In an additional aspect of the disclosure, an apparatus is provided that includes first and second antenna ports. The apparatus further includes a processor configured to provide a random access channel (RACH) preamble to the first antenna port and to the second antenna port and provide a RACH payload to the first antenna port and to the second antenna port. The apparatus further includes a transceiver configured to transmit the RACH preamble and the RACH payload as provided to the first and second antenna ports to a wireless communications device.

In an additional aspect of the disclosure, an apparatus is provided that includes a transceiver configured to receive a random access channel (RACH) preamble from a wireless communications device, wherein the RACH preamble was split into first and second antenna ports and receive a RACH payload from the wireless communications device, wherein the RACH payload was split into the first and second antenna ports. The apparatus further includes a processor configured to recover first and second data streams corresponding to the first and second antenna ports for the RACH preamble and third and fourth data streams corresponding to the first and second antenna ports for the RACH payload and determine an identity of the wireless communications device and a response message based on the recovering the first and second, and third and fourth, data streams.

In an additional aspect of the disclosure, a computer-readable medium is provided having program code recorded thereon, the program code comprising code for causing a first wireless communications device to provide a random access channel (RACH) preamble to a first antenna port of the first wireless communications device and to a second antenna port of the first wireless communications device. The program code further comprises code for causing the first wireless communications device to provide a RACH payload to the first antenna port and to the second antenna port. The program code further comprises code for causing the first wireless communications device to transmit the RACH preamble and the RACH payload as provided to the first and second antenna ports to a second wireless communications device.

In an additional aspect of the disclosure, a computer-readable medium is provided having program code recorded thereon, the program code comprising code for causing a first wireless communications device to receive a random access channel (RACH) preamble from a second wireless communications device, wherein the RACH preamble was split into first and second antenna ports. The program code further comprises code for causing the first wireless communications device to receive a RACH payload from the second wireless communications device, wherein the RACH payload was split into the first and second antenna ports. The program code further comprises code for causing the first wireless communications device to recover first and second data streams corresponding to the first and second antenna ports for the RACH preamble and third and fourth data streams corresponding to the first and second antenna ports for the RACH payload. The program code further comprises code for causing the first wireless communications device to determine an identity of the second wireless communications device and a response message based on the recovering the first and second, and third and fourth, data streams.

In an additional aspect of the disclosure, an apparatus is provided that includes means for providing a random access channel (RACH) preamble to a first antenna port of the apparatus and to a second antenna port of the apparatus. The apparatus further includes means for providing a RACH payload to the first antenna port and to the second antenna port. The apparatus further includes means for transmitting the RACH preamble and the RACH payload as provided to the first and second antenna ports to a wireless communications device.

In an additional aspect of the disclosure, an apparatus is provided that includes means for receiving a random access channel (RACH) preamble from a wireless communications device, wherein the RACH preamble was split into first and second antenna ports. The apparatus further includes means for receiving a RACH payload from the wireless communications device, wherein the RACH payload was split into the first and second antenna ports. The apparatus further includes means for recovering first and second data streams corresponding to the first and second antenna ports for the RACH preamble and third and fourth data streams corresponding to the first and second antenna ports for the RACH payload. The apparatus further includes means for determining an identity of the wireless communications device and a response message based on the recovering the first and second, and third and fourth, data streams.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
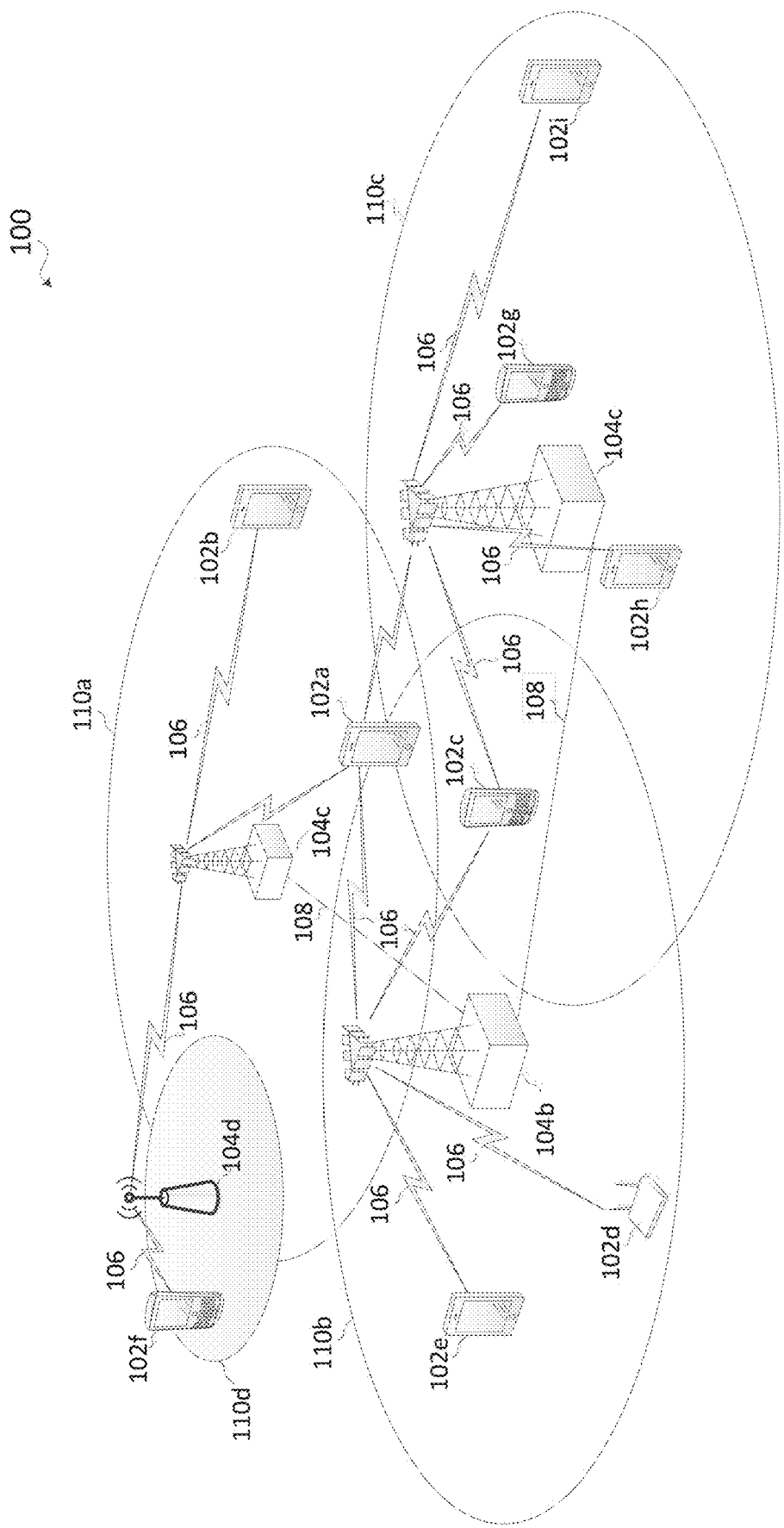
FIG. 1 illustrates an exemplary wireless communication environment according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA, LTE networks, GSM networks, and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network.

Further, devices may also communicate with one another using various peer-to-peer technologies such as LTE-Direct (LTE-D), Bluetooth, Bluetooth Low Energy (BLE), ZigBee, radiofrequency identification (RFID), and/or other ad-hoc or mesh network technologies. Embodiments of this disclosure are directed to any type of modulation scheme that may be used on any one or more of the above-recited networks and/or those yet to be developed.

Embodiments of the present disclosure introduce systems and techniques to transmit random access signals, including RACH preambles and RACH payloads from a UE to an eNB using multiple antenna ports and in a two-step procedure (instead of a four-step procedure).

For example, a UE selects a random access sequence and splits the data stream containing the random access sequence into a number of streams that equals a number of antenna ports for the UE (e.g., copies of the sequences equaling the number of antenna ports). For example, this may be two (for purposes of this discussion). After splitting it up into two streams corresponding to two antenna ports, the random access sequence is formulated into a RACH preamble and transmitted via one or more antenna arrays according to a mapping of the two antenna ports to the antenna array(s) (e.g., two different polarizations, different subarrays, etc.).

As a further example, the UE 102 may multiplex the RACH preamble from the multiple ports to tones for transmission using a variety of approaches. In an approach, the UE may apply a form of frequency division multiplexing by placing a first copy corresponding to a first antenna port on a first frequency tone, and placing a second copy of the RACH preamble corresponding to a second antenna port on a second frequency tone, where the first and second frequency tones do not overlap. This allows the receiving eNB to discern the channels used to convey the copies of the RACH preamble from the UE.

In another approach, the UE may apply a form of spreading multiplexing. The UE may spread a copy of the RACH preamble to both antenna ports (in a two-port example; to the number of ports in a more general example) on the same frequency tone, and then again on a second frequency tone. One of the copies, such as on one of the ports for the second frequency tone, may be modified from the others such as by applying a negative value. This also aids in allowing the eNB to discern the channels used to convey the copies of the RACH preamble.

Further, the UE may also modify the split of transmit power between the antenna ports. This may be done based on a respective receive power observed at each of the antenna ports for received downlink signaling (e.g., downlink synchronization signaling whether primary or secondary). Thus, where there is a difference in observed receive power, the UE may modify transmit power per antenna port based on the observed difference in the receive power previously.

The eNB receives the transmitted RACH preamble, recovers into the same number of streams as antenna ports at the UE, and correlates the RACH preamble against a reference list of the random access sequences generated (or provided from) the eNB. The results of the correlation are summed and used in identifying the UE, detect timing, and send random access responses (e.g., for making access grants).

Further, the UE may transmit a RACH payload directly after transmitting the RACH preamble, e.g. without waiting for a response from the corresponding eNB in communication with the UE. The UE may split the RACH payload as well into the number of streams corresponding to the same number of antenna ports. The UE may also multiplex the RACH payload, for example using space frequency block coding (SFBC). In other examples, the UE may use the FDM or spreading multiplexing approaches instead, and/or may do so with the same approach used for the RACH preamble.

In some embodiments, the UE may use the RACH preamble as a reference signal to the eNB. The eNB may therefore use the RACH preamble it receives to estimate one or more properties of the channels used between the UE and eNB for the RACH procedure. The result of this estimation may be directly used by the eNB in receiving and decoding the RACH payload transmitted directly after the RACH preamble. In response to receiving both the RACH preamble and the RACH payload after each other, the eNB may respond with a combined message that includes control information and contention resolution information for the UE, thereby reducing the RACH procedure from a four-step procedure to a two-step procedure, while also enabling the UE to communicate RACH information with multiple antenna ports.

FIG. 1 illustrates a wireless communication network 100 in accordance with various aspects of the present disclosure. The wireless communication network 100 may include a number of UEs 102, as well as a number of evolved Node Bs (eNodeB, or eNB) 104. The eNBs 104 may also be referred to generally as base stations. An eNB 104 may also be referred to as an access point, base transceiver station, a node B, etc. An eNB 104 may be a station that communicates with the UEs 102.

The eNBs 104 communicate with the UEs 102 as indicated by communication signals 106. A UE 102 may communicate with the eNB 104 via an uplink and a downlink. The downlink (or forward link) refers to the communication link from the eNB 104 to the UE 102. The uplink (or reverse link) refers to the communication link from the UE 102 to the eNB 104. The eNBs 104 may also communicate with one another, directly or indirectly, over wired and/or wireless connections, as indicated by communication signals 108.

UEs 102 may be dispersed throughout the wireless network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, a drone, an entertainment device, a hub, a gateway, an appliance, a wearable, peer-to-peer and device-to-device components/devices (including fixed, stationary, and mobile), Internet of Things (IoT) components/devices, and Internet of Everything (IoE) components/devices, etc. The wireless communication network 100 is one example of a network to which various aspects of the disclosure apply.

Each eNB 104 may provide communication coverage for a particular geographic area. In 3GPP, the term "cell" can refer to this particular geographic coverage area of an eNB and/or an eNB subsystem serving the coverage area, depending on the context in which the term is used. In this regard, an eNB 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like).

An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 104a, 104b and 104c are examples of macro eNB for the coverage areas 110a, 110b and 110c, respectively (also referred to as cells herein). The eNB 104d is an example of pico and/or femto eNBs for the coverage area 110d, respectively. An eNB 104 may support one or multiple (e.g., two, three, four, and the like) cells.

The wireless communication network 100 may also include relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. A relay station may also be referred to as a relay eNB, a relay UE, a relay, and the like. Some relays may also have UE capabilities/functionalities.

The wireless communication network 100 may support synchronous or asynchronous operation. For synchronous operation, the eNBs 104 may have similar frame timing, and transmissions from different eNBs 104 may be approximately aligned in time. For asynchronous operation, the eNBs 104 may have different frame timing, and transmissions from different eNBs 104 may not be aligned in time.

In some implementations, the wireless communication network 100 utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

According to embodiments of the present disclosure, when a UE 102 is ready to transmit a RACH preamble to an eNB 104, it may do so using multiple antenna ports instead of just one. In the present example, two antenna ports will be described for use herein. According to the random access procedure, after selecting a RACH preamble sequence the UE 102 further processes the RACH preamble sequence for transmission to the eNB 104. As part of that processing, the UE 102 splits (e.g., copies) the RACH preamble sequence to two streams for two antenna ports. Further processing may occur (e.g., to potentially further beamform the two streams) after which the two streams from the two antenna ports are transmitted to the eNB 104 as a RACH preamble.

The eNB 104 receives the transmitted RACH preamble and recovers the two streams. These two streams are both correlated to identify the selected RACH preamble sequence, the UE 102 that selected the RACH preamble sequence, and potentially detect timing as well. The eNB 104 uses this information in determining a random access response to the UE 102 towards an access grant for the UE 102, which may be conveyed to the UE 102 where such is determined. Thus, according to embodiments of the present disclosure, UEs 102 use multiple antenna ports for RACH preamble transmission.

According to additional embodiments of the present disclosure, the UE 102 combines the RACH preamble and a RACH payload as an enhanced message that is sent together insofar as the eNB 104 does not respond with its own aspects of the RACH procedure until both the RACH preamble and the RACH payload have been received from the UE 102. Thus, the four-step RACH procedure is reduced to a two-step RACH procedure according to embodiments of the present disclosure.

According to the random access procedure, after selecting a RACH preamble sequence the UE 102 further processes the RACH preamble sequence for transmission to the eNB 104. As part of that processing, the UE 102 splits (e.g., copies) the RACH preamble sequence to two streams for two antenna ports. Further processing may occur (e.g., to potentially further beamform the two streams, such as based on the particular beam from which a reference signal, such as a synchronization signal (e.g., primary synchronization signal, secondary synchronization signal, physical broadcast channel (PBCH) signal, demodulation reference signal (DMRS)) (or channel state information reference signal (CSI-RS), mobility reference signal (MRS), or some combination thereof) from the eNB 104 was previously received at with the best signal characteristics from among all the beams). In some embodiments, the UE 102 uses a frequency division multiplexing scheme (FDM scheme) to transmit the RACH preamble from the different ports.

In this example, the UE 102 places a first copy of the RACH preamble into a first frequency resource, e.g. a tone, at the first antenna port. Further, the UE 102 places a second copy of the RACH preamble into a second frequency resource, e.g. a second tone, at the second antenna port. These two tones are non-overlapping. Thus, after transmission to the eNB 104, the receiving end is able to distinguish the channels used to transmit the same RACH preamble from the different antenna ports.

In other embodiments, the UE 102 uses a spreading multiplexing scheme to transmit the RACH preamble from the different ports. For example, a copy of the same RACH preamble may be transmitted using multiple overlapping frequency resources from both antenna ports—e.g., the signal may be copied on the same frequency resource with the same value from both antenna ports, and again be copied on an additional shared frequency resource, but with the value of the RACH preamble inverted at the second antenna port. For example, using principles of code division multiple access, the RACH preamble may be spread using a spreading code of [+1 +1] for a first antenna port and [+1 −1] for a second antenna port as just one example.

Under either multiplexing approach (which is used to enable the receiving eNB 104 to distinguish the signal sent over the multiple channels), the two streams from the two antenna ports are transmitted to the eNB 104 as a RACH preamble. After transmitting the RACH preamble, the UE 102 may begin transmitting the RACH payload without waiting for an initial response to the RACH preamble from the eNB 104. Thus, the UE 102 may similarly split copies of the RACH payload and provide the copies to the first and second antenna ports. These copies may also be multiplexed using any number of options, such as SFBC or the FDM or spreading alternatives discussed above.

The eNB 104 receives the transmitted RACH preamble and recovers the two streams. As noted above, these two streams are both correlated to identify the selected RACH preamble sequence, the UE 102 that selected the RACH preamble sequence, and potentially detect timing as well. The eNB 104 uses this information in determining a random access response to the UE 102 towards an access grant for the UE 102. Further, the eNB 104 may receive the transmitted RACH payload from the UE 102 and recover these two streams as well (where transmission may have been structured according to the same multiplexing or a different scheme, such as space frequency block coding (SFBC), etc.), all prior to transmitting a response to the UE 102. In some embodiments, the UE 102 relies upon the RACH preamble it transmits over the multiple channels to serve as a type of reference signal (RS) instead of explicitly including such a signal (such as DMRS) for channel state estimation.

In response, the eNB 104 prepares a response which combines the messages that have been traditionally sent separately, including control information (typically "message 2" of the RACH procedure) and contention resolution information (typically "message 4" of the RACH procedure) which may be conveyed in a combined message to the UE 102. Thus, according to embodiments of the present disclosure, UEs 102 use multiple antenna ports for RACH preamble transmission as well as RACH payload transmission while both the UE 102 and the eNB 104 reduce the time necessary to complete the RACH procedure.

Figure 2:
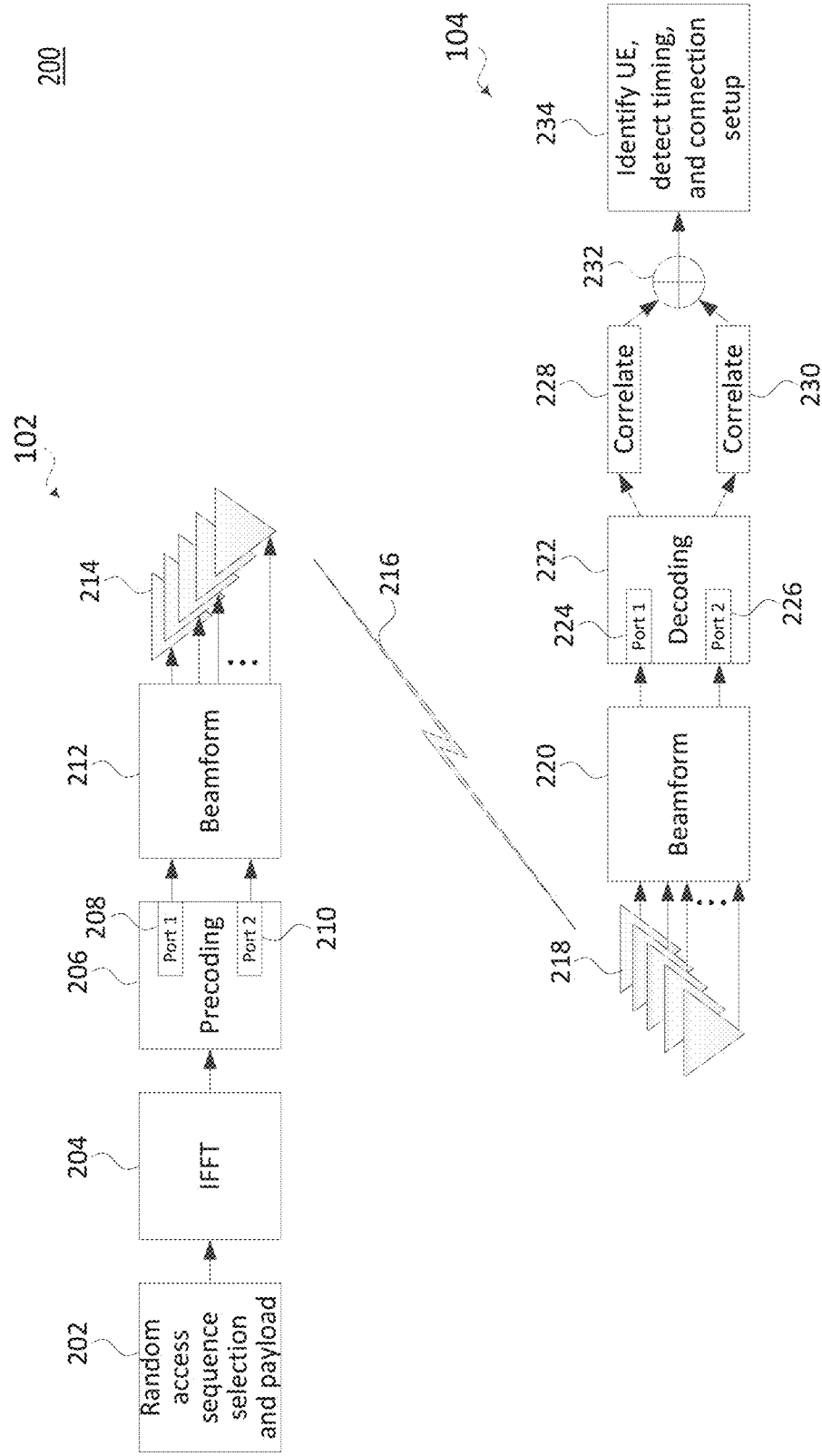
FIG. 2 is a block diagram of an exemplary relationship between exemplary wireless communication devices according to embodiments of the present disclosure.

FIG. 2 is a block diagram of an exemplary relationship between exemplary wireless communication devices according to embodiments of the present disclosure. In particular, FIG. 2 illustrates a relationship according to embodiments of the present disclosure between an exemplary UE 102 and an exemplary eNB 104.

At the UE 102, a random access sequence selection and payload 202 provides a random access sequence as well as subsequent payload for the UE 102 to use according to embodiments of the present disclosure in a random access procedure. As noted above, the UE 102 may transmit a RACH preamble using multiple antenna ports instead of just one. Moreover, in further embodiments the UE 102 may also shorten the RACH procedure to a two-step procedure. This discussion will step through the elements as pertains to the RACH preamble first (i.e., whether as a stand-alone procedure or in combination with the shortened two-step RACH procedure), followed by the RACH payload.

For example, the preamble selection 202 may be from a memory storing the available random access sequence identified previously by a broadcast from the eNB 104. For example, the random access sequence may be generated as a Zadoff Chu sequence with a given length (e.g., 139). Further, the selection 202 may include the UE 102 randomly selecting one out of a number of possible cyclic shifts (e.g., 4). Further, the UE 102 may also generate a temporary identifier (ID), which may be done as a function of the selected cyclic shift.

The UE 102 performs an inverse fast Fourier transform (IFFT) 204 on the selected random access sequence for the RACH preamble transmission (i.e., whether stand-alone or as the preamble portion of the shortened two-step RACH procedure). The random access sequence, in the time domain from the IFFT 204, is precoded 206.

As part of precoding, the random access sequence is split into two streams, one for each of two antenna ports 208, 210 (referring herein to the logical concept of antenna ports that feed any number of a variety of combinations of physical antenna for transmission over the air). Two ports are used as an example for simplicity of discussion. More ports may additionally be used according to the principles herein. The UE 102 may further use observed received power from one or more reference signals (e.g., synchronization signals, CSI-RS, MRS, etc.) from the eNB 104 of the two channels corresponding to the two antenna ports 208, 210, and use the observed values to modify the transmit power between the two antenna ports 208, 210 accordingly. For example, if the receive power observed from the antenna port 208 was greater than that observed from the antenna port 210, the UE 102 at precoding 206 may weight the transmit power according to that relationship. Thus, the transmit power of the two streams may correspond to (e.g., be approximately the same as or be proportional to) the received power observed during a downlink synchronization.

To illustrate, the UE 102 may weight the transmit power to allocate more transmit power to the antenna port 208 than is allocated to the antenna port 210 (e.g., to maximize a minimum rate to the base station). The overall preamble transmission power, identified here as $P_{RACH}$, may be expressed by the general relationship (i.e., of a general antenna port):

$$P_{RACH} = \min\{P_{CMAX,c}(i), \text{PREAMBLE\_RECEIVED\_TARGET\_POWER} + PL_c\}\_[\text{dBm}].$$

Here, $P_{CMAX,c}(i)$ refers to the UE transmit power for the $i^{th}$ subframe and $PL_c$ refers to a downlink pathloss estimate, such as calculated by the UE. Below, $P_{RACH1}$ refers to the preamble transmission power at the antenna port 208, and $P_{RACH2}$ refers to the preamble transmission power at the antenna port 210. This is because, generally, according to embodiments of the present disclosure RACH transmit power is assessed across all of the ports in use (in the example here, two ports though any number may be used above that). Thus, the downlink pathloss estimate corresponding to the multiple ports may be different from each other. Each preamble transmission power value ($P_{RACH}$) may be identified by the following relationships:

$$P_{RACH1}=\min\{P_{max1}, \text{PREAMBLE\_RECEIVED\_TARGET\_POWER}_1+PL_{c1}\}\_[\text{dBm}]; \text{ and}$$

$$P_{RACH2}=\min\{P_{max2}, \text{PREAMBLE\_RECEIVED\_TARGET\_POWER}_2+PL_{c2}\}\_[\text{dBm}].$$

The UE 102 may receive, via signaling from the eNB 104, identification of the maximum power $P_{max1}$ and $P_{max2}$ for each antenna port 208, 210 (e.g., via a few bits in Random Mobile Subscriber Identity (RMSI) that convey a list of options). The maximum power information may have been configured by the eNB 104 and a rule may have been defined in order to find the maximum power $P_{max1}$ and $P_{max2}$ for each antenna port 208, 210 (using the two ports as a continued example, with the understanding that this is applicable to any number of ports). The rule may identify that $P_{max1}$ and $P_{max2}$ both equal $P_{max/2}$ (the maximum power divided by two, the number of antenna ports). The particular rule may be UE-implementation specific or may alternatively be a general rule.

Moreover, PREAMBLE_RECEIVED_TARGET_POWER, and PREAMBLE_RECEIVED_TARGET_POWER$_2$ may likewise be configured by eNB 104. Typically, PREAMBLE_RECEIVED_TARGET_POWER, PREAMBLE_RECEIVED_TARGET_POWER$_2$=PREAMBLE_RECEIVED_TARGET_POWER. In some other cases, PREAMBLE_RECEIVED_TARGET_POWER, = PREAMBLE_RECEIVED_TARGET_POWER$_2$= PREAMBLE_RECEIVED_TARGET_POWER.

The UE 102 may determine if a required transmit power exceeds a total maximum allowed power. For example, if $P_{RACH1}=P_{max1}$ PREAMBLE_RECEIVED_TARGET_POWER$_1$+PL$_c$+1, and $P_{RACH1}$ $P_{RACH2}$<=$P_{max}$, then the UE 102 may use this policy. If, however, that relationship does not hold (i.e., not <=), then the UE 102 may check whether any antenna port 208, 210 is too degraded to be used at the time. For example, if PREAMBLE_RECEIVED_TARGET_POWER$_1$+ PL$_{c1}$≤$P_{MAX}$≤PREAMBLE_RECEIVED_TARGET_POWER$_2$+PL$_{c2}$, then that identifies that the second port's channel (here, corresponding to antenna port 210) is too weak to carry RACH transmission.

If, however, PREAMBLE_RECEIVED_TARGET_POWER$_i$+PL$_{ci}$≤PMAX for both values of i∈{1, 2} (i.e., the number corresponding to the number of antenna ports in the system, here two), but $\Sigma_{i=1}^{2}$ PREAMBLE_RECEIVED_TARGET_POWER$_i$+PL$_{Ci}$≥$P_{MAX}$, then the UE 102 may scale the RACH transmit power of an antenna port according to its link gain. These are by way of example only; other weighting approaches may instead be used, including equally dividing the transmit power between the ports.

The two streams of the two antenna ports 208, 210 are beamformed 212 as desired/instructed. For example, in some embodiments of the present disclosure frequencies in the millimeter wave range (i.e., on the order of 28 GHz, etc.) may be used. Thus, many antennae with a smaller form factor than those for lower frequencies may be used, allowing for many smaller directional beams with focused energy (and which may enable spatial reuse to a greater degree than currently used). The different beams may be transmitted in different directions and thus may result in varying levels of signal quality at the UE 102. The UE 102 may have selected the beam or beams with the highest signal quality (e.g., SNR, BER, etc.), in which case beamforming 212 may include this selection.

Further, the two streams may be provided to antennas 214 (which may be mapped in any of a number of alternatives to the two antenna ports 208, 210) for transmission over the channel 216, which may include noise. The antenna ports 208, 210 may be connected to two different polarizations (e.g., of the same antenna array as antennas 214). Alternatively, the antenna ports 208, 210 may be connected to different subarrays, e.g. a first antenna subarray mapped to antenna port 208 and a second antenna subarray mapped to antenna port 210, where the two subarrays are different from each other. Thus, the antenna ports 208, 210 may share different antennas.

The tones used for transmitting the random access sequence (e.g., a RACH preamble) may be placed in approximately the middle of the frequency region (e.g., 1344 system tones, 40.32 MHz). As an example, the tones may be selected based on one multiplexing approach from among a plurality of possible multiplexing approaches. For example the UE 102 uses a frequency division multiplexing scheme (FDM scheme) to transmit the RACH preamble from the different ports. Accordingly, the UE 102 places a first copy of the random access sequence (the first stream) into a first frequency resource, e.g. a tone, at the first antenna port. Further, the UE 102 places a second copy of the random access sequence (the second stream) into a second frequency resource, e.g. a second tone, at the second antenna port. These two tones are non-overlapping.

In other embodiments, the UE 102 uses a spreading multiplexing scheme to transmit the random access sequence from the different ports. For example, a copy of the random access sequence may be transmitted using multiple overlapping frequency resources from both antenna ports—e.g., the same stream may be copied on the same frequency resource with the same value from both antenna ports, and again be copied on an additional shared frequency resource, but with the value of the random access sequence inverted at the second antenna port.

The antennas 218 of the eNB 104 receive the transmitted RACH preamble from the channel 216. This is fed for beamforming 220, resulting in recovering the same number of streams of the received RACH preamble corresponding to antenna ports 224, 226. The RACH preamble is decoded 222 and fed into correlators for correlation 228, 230. The number of correlators may equal the number of antenna ports used by the UE 102 in transmitting the RACH preamble. The results of correlation are summed 232 and then identified 234 based on comparison against the available reference sequences maintained by the eNB 104.

As the RACH preamble is transmitted to the eNB 104, the UE 102 proceeds with preparing and sending the RACH payload without waiting for a response from the eNB 104, thereby achieving the two-step RACH procedure noted above. For example, the random access sequence and selection and payload 202 may provide the RACH payload for transmission. The RACH payload may include, for example, an RRC connection request, a tracking area update, a scheduling request, etc. This may be may be from a memory as well.

The UE 102 again performs an IFFT 204 on the RACH payload and then the RACH payload is precoded 206 after the IFFT 204. Like what occurred with the RACH preamble noted above, the RACH payload is split into two streams (continuing with the example of two antenna ports), one for each of two antenna ports 208, 210. The UE 102 may further again use observed received power from one or more reference signals (e.g., synchronization signals, CSI-RS, MRS, etc.) from the eNB 104 of the two channels corresponding to the two antenna ports 208, 210, and use the observed values to modify the transmit power between the two antenna ports 208, 210 accordingly.

The two streams (the RACH payload) of the two antenna ports 208, 210 are beamformed 212 as desired/instructed. Further, the two streams may be provided to antennas 214 (which may again be mapped in any of a number of alternatives to the two antenna ports 208, 210) for transmission over the channel 216, which may include noise. The tones selected may be based on SFBC or another alternative. In other embodiments, as discussed above with respect to the RACH preamble, the tones used for transmitting the RACH payload may be selected based on a multiplexing approach. In some embodiments, the multiplexing scheme used for the RACH payload will be the same as was used for the RACH preamble, while in other embodiments the multiplexing schemes between the two may change.

The antennas 218 of the eNB 104 also receive the transmitted RACH payload from the channel 216. This is fed for beamforming 220, resulting in recovering the same number of streams of the received RACH payload corresponding to antenna ports 224, 226. The RACH payload is decoded 222 and the information recovered for further processing. In some embodiments, the UE 102 may have transmitted the RACH preamble with the express purpose that the eNB 104 use the RACH preamble as a demodulation reference signal, in which case the eNB 104 may use that to aid in characterizing the channels (for channel state estimation) and therefore in RACH payload demodulation.

The eNB 104, now with both the RACH preamble and the RRC connection request, tracking area update, and scheduling request, all prior to the eNB 104 sending the random access response (RAR), the eNB 104 prepares an enhanced reply message for the UE 102. This may include both the RAR (which may include an identifier of the RACH preamble, a timing advance, an uplink grant, cell radio network temporary identifier (C-RNTI), and backoff indicator to name some examples) as well as a response to the RRC connection request of the RACH payload that may include a contention resolution message. The eNB 104 may transmit this combined response as a combined response message to the UE 102 to complete the RACH procedure according to embodiments of the present disclosure.

Figure 3:
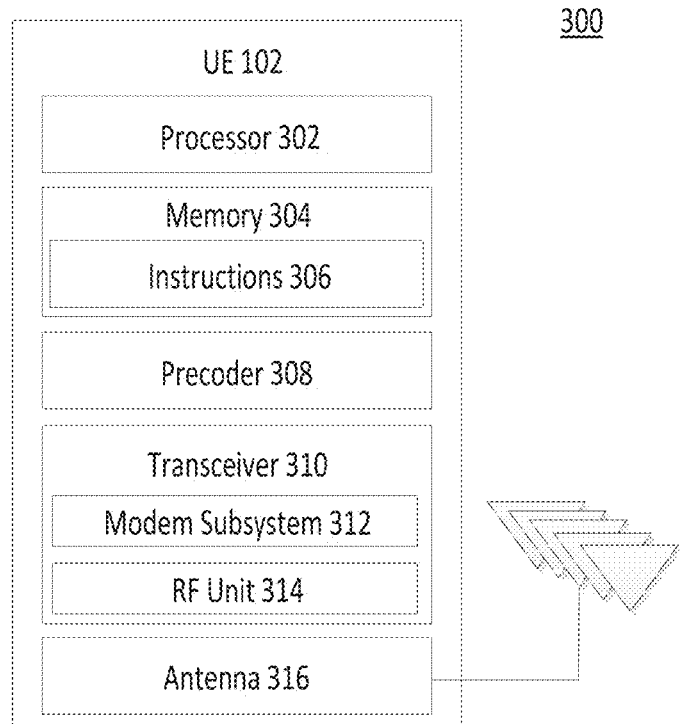
FIG. 3 is a block diagram of an exemplary wireless communication device according to embodiments of the present disclosure.

FIG. 3 is a block diagram of an exemplary wireless communication device 300 according to embodiments of the present disclosure. The wireless communication device 300 may be a UE having any one of many configurations described above. For purposes of example, wireless communication device 300 may be a UE 102 as discussed above with respect to FIG. 1. The UE 102 may include a processor 302, a memory 304, a precoder module 308, a transceiver 310 (including a modem 312 and RF unit 314), and an antenna 316. These elements may be in direct or indirect communication with each other, for example via one or more buses.

The processor 302 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the UEs 102 introduced in FIG. 1 and further in FIG. 2 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein with reference to a UE 102 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The precoder module 308 may be used for various aspects of the present disclosure. The precoder module 308 may include various hardware components and/or software components to assist in these aspects with respect to both RACH preamble transmission and RACH payload transmission.

For example, after the random access sequence is selected and IFFT performed on it (e.g., using the processor 302 and the memory 304), the precoder module 308 may split the random access sequence stream into the number of streams corresponding to the number of antenna ports for the UE 102. In the example from FIG. 2, with two antenna ports the split is into two streams. This may also include modifying (e.g., weighting) the transmit power of the two ports, as discussed above, for example as part of precoding, where a difference was previously observed with receive power in the two streams of the two antenna ports during previous receipt of downlink synchronization signaling (such as primary synchronization signals (PSS) and secondary synchronization signals (SSS)).

Further, the precoder module 308 may aid in selecting what tones the split random access sequence is transmitted on from the two antenna ports (using FIG. 2's number of ports as the example again for discussion with respect to FIG. 3). There are several different multiplexing approaches possible, as noted above. For example, the precoder module 308 may use an FDM multiplexing approach, where a first copy of the random access sequence is placed into a first frequency resource and a second copy of the random access sequence is placed into a second frequency resource. These two frequency resources, i.e. tones, are non-overlapping. The channel characteristics h may therefore be characterized with respect to the random access sequence s as follows: there is a first channel $h_1$ associated with the copy at the first antenna port, and a second channel $h_2$ associated with the copy at the second antenna port. Since the frequency tones selected are non-overlapping between the ports, the channel characteristics as seen by the eNB 104 receive would be:
(1) $h_1*s+n$ (where n is noise in the channel, such as Gaussian noise); and
(2) $h_2*s+n$.

Because the signals are in non-overlapping tones, the eNB 104 is able to distinguish the channels from the two antenna ports at the UE 102. The frequency divisions may take on any number of forms, for example using odd-numbered tones for the first antenna port and even-numbered tones for the second antenna port, or vice-versa, etc.

Alternatively, the precoder module 308 may use a spreading multiplexing approach, where a copy of the random access sequence may be transmitted using multiple overlapping frequency resources from both antenna ports. Thus, like the FDM alternative, the same signal s may be copied for both ports, but the frequencies selected may differ in that the same tones are selected, but one or more characteristics of the signal s are modified depending upon port. For example, the same frequencies may be selected at each port, and the same signal provided, but modified at one of the ports for one of the frequency tones selected. The channel characteristics as seen by the eNB 104, such as where the spreading sequence [+1 +1] at a first port and [+1 −1] at the second port is used as given as an example above with respect to FIG. 1, would be:

(3) $(h_1+h_2)*s+n$; and
(4) $(h_1-h_2)*s+n$.

Because the channel characteristics vary between the two ports' transmissions, i.e. because the transmission from the second port is $h_1-h_2$, the eNB 104 is still able to distinguish the channels for further processing. The spreading may be to two or more copies, and in some examples may assume a form of code division multiplexing.

Whatever the approach used for multiplexing between the ports so that the signals are discernible at the eNB 104, the two streams are then provided to the transceiver 310 according to the mapping of the antenna ports to respective physical antennas 316 of the UE 102.

The precoder module 308 may further be used with respect to the RACH payload that follows the RACH preamble. In some embodiments, the precoder module 308 may rely upon the RACH preamble as a reference signal for the RACH payload, for example instead of including a traditional reference signal, such as DMRS, with the first transmission.

The precoder module 308 may select the information, or may receive the information from another source, to be included as the RACH payload. This may include information such as an RRC connection request, a tracking area update, a scheduling request, etc. The precoder module 308 may provide the RACH payload as the RACH preamble is being transmitted to the eNB 104 so that the RACH payload may immediately follow the RACH preamble's transmission, such that both messages are essentially transmitted as a single message prior to the eNB 104 responding. This reduces the RACH procedure to a two-step process instead of a four-step process, improving efficiencies.

The RACH payload similarly is split into two streams (in the two-antenna-port example, in the n-port scenario the RACH payload is split into n streams). The precoder module 308 may further use SFBC or some other approach for lining up tones for transmission, or alternatively may multiplex the streams to name some examples.

As shown, the transceiver 310 may include the modem subsystem 312 and the radio frequency (RF) unit 314. The transceiver 310 can be configured to communicate bi-directionally with other devices, such as eNBs 104 and/or other network elements. The modem subsystem 312 may be configured to modulate and/or encode data according to a MCS, e.g., a LDPC coding scheme, a turbo coding scheme, a convolutional coding scheme, a polar coding scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as an eNB 104. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information) such as RACH preambles and RACH payloads in the present disclosure, to the antenna 316 for transmission to one or more other devices. The antenna 316 may further receive data messages transmitted from other devices and provide the received data messages for processing and/or demodulation at the transceiver 310. As illustrated, antenna 316 may include multiple antennas in a MIMO configuration of similar or different designs in order to sustain multiple transmission links for such things as spatial diversity, for implementation according to embodiments of the present disclosure.

Figure 4:
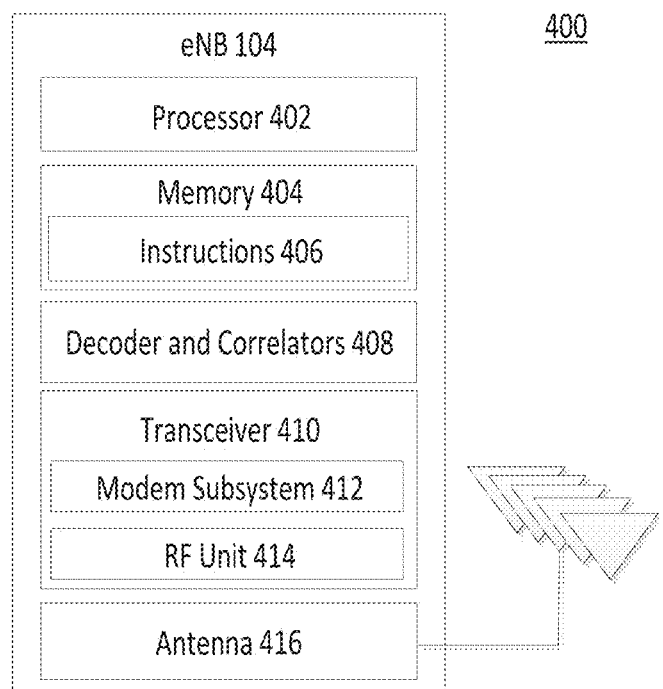
FIG. 4 is a block diagram of an exemplary wireless communication device according to embodiments of the present disclosure.

FIG. 4 is a block diagram of an exemplary wireless communication device 400 according to embodiments of the present disclosure. The wireless communication device 400 may be an eNB having any one of many configurations described above. For purposes of example, wireless communication device 400 may be an eNB 104 as discussed above with respect to FIGS. 1 and 2. The eNB 104 may include a processor 402, a memory 404, a decoder and correlator 408, a transceiver 410 (including a modem 412 and RF unit 414), and an antenna 416. These elements may be in direct or indirect communication with each other, for example via one or more buses.

The processor 402 may have various features as a specific-type processor. For example, these may include a CPU, a DSP, an ASIC, a controller, an FPGA device, another hardware device, a firmware device, or any combination thereof configured to perform the operations described herein with reference to the eNBs 104 introduced in FIG. 1 above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, solid state memory device, hard disk drives, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein with reference to an eNB 104 in connection with embodiments of the present disclosure.

The decoder and correlator 408 may be used for various aspects of the present disclosure. The decoder and correlator 408 may include various hardware components and/or software components to assist in recovering received data into the number of streams (antenna ports) from the UE 102, correlating the received data to the random access sequences available for the random access process, identifying the UE, recovering the RACH payload data (where, in some embodiments, the RACH preamble is used as a reference signal for characterizing the channels for the RACH payload, such as a channel state estimate), and granting access as a result.

The decoder and correlator 408 may operate in cooperation with the processor 402 and memory 404 to recover the received data first from the RACH preamble transmission into the same number of streams as the antenna ports of the UE 102, correlate the data in those streams with respective correlators, and perform identification, timing detection, access granting, and any other appropriate functions. Further, the decoder and correlator 408 may operate in cooperation with the processor 402 and memory 404 to recover the received data from the RACH payload transmission after having received the RACH preamble, all prior to sending a response to the UE 102. The recovery of the RACH payload is also into the same number of streams as the antenna ports of the UE 102.

In some embodiments, the eNB 104 uses the RACH preamble as reference signals in order to characterize/estimate the channels (e.g., $h_1$ and $h_2$) from the UE 102 to improve recovery of the RACH payload transmission.

The eNB 104, with both the RACH preamble and the RACH payload (e.g., including RRC connection request, tracking area update, and scheduling request), prepares an enhanced reply message for the UE 102 (all prior to the eNB 104 sending its response). The enhanced reply message may include the random access response (RAR), which may include an identifier of the RACH preamble, a timing advance, an uplink grant, cell radio network temporary identifier (C-RNTI), and backoff indicator to name some examples, as well as a response to the RRC connection request of the RACH payload that may include a contention resolution message.

As shown, the transceiver 410 may include the modem subsystem 412 and the RF unit 414. The transceiver 410 can be configured to communicate bi-directionally with other devices, such as UEs 102 and/or other network elements. The modem subsystem 412 may be configured to modulate and/or encode data according to a MCS, e.g., a LDPC coding scheme, a turbo coding scheme, a convolutional coding scheme, a polar coding scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Thus, according to embodiments of the present disclosure, the UE 102 use multiple antenna ports for RACH preamble transmission as well as RACH payload transmission while both the UE 102 and the eNB 104 reduce the time necessary to complete the RACH procedure.

Although shown as integrated together in transceiver 410, the modem subsystem 412 and the RF unit 414 may be separate devices that are coupled together at the eNB 104 to enable the eNB 104 to communicate with other devices. The RF unit 414 may provide the modulated and/or processed data, e.g. data packets (or, more generally, data messages that may contain one or more data packets and other information, such as downlink reference signals) to the antenna 416 for transmission to one or more other devices. The antenna 416 may further receive data transmitted from other devices and provide the received data messages for processing and/or demodulation at the transceiver 410.

This may include, for example, receiving the RACH preamble split into multiple streams corresponding to multiple antenna ports as well as RACH payload split into the same number of streams as antenna ports of the UE 102 according to embodiments of the present disclosure (or just the RACH preamble from the multiple antenna ports where the two-step procedure is not included). As illustrated, antenna 416 may include multiple antennas in a MIMO configuration of similar or different designs in order to sustain multiple transmission links.

Figure 5A:
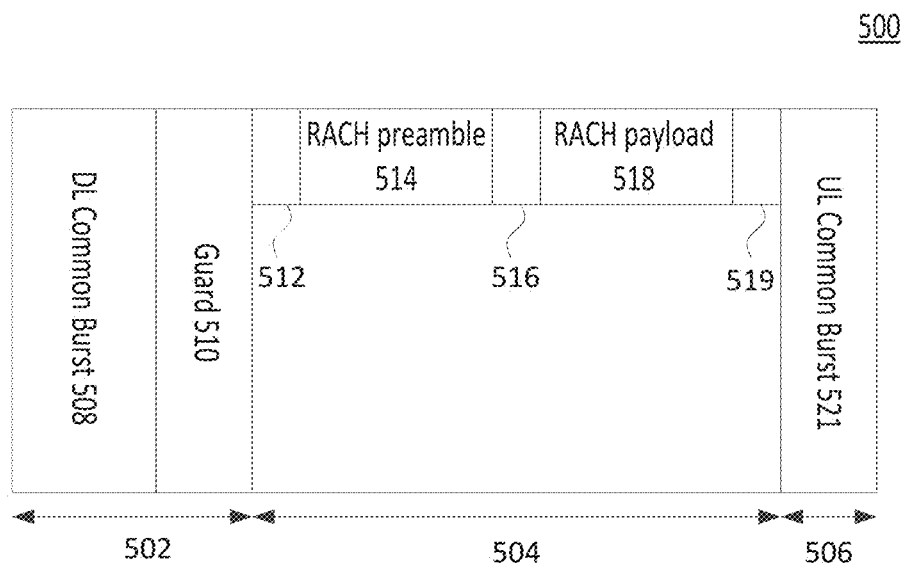
FIG. 5A is a block diagram of an exemplary two-step RACH procedure in uplink communication according to embodiments of the present disclosure.

Turning now to FIG. 5A, a block diagram is illustrated of an exemplary two-step RACH procedure 500 in uplink communication according to embodiments of the present disclosure.

The two-step RACH procedure 500 includes a first symbol period 502, a second symbol period 504, and a third symbol period 506. The first symbol period 502, which for example may have a relatively short symbol duration, e.g. 3 symbols, includes the DL common burst 508 and a guard interval 510.

The second symbol period 504 includes both the RACH preamble 514 and the RACH payload 518 according to embodiments of the present disclosure, both transmitted from a UE 102. The RACH preamble 514 may include a cyclic prefix 512, and the RACH payload 518 may include a cyclic prefix 516. Following the RACH payload 518, a guard 519 before an UL common burst 521. As can be seen, the UE 102 transmits both the RACH preamble 514 and the RACH payload 518 without any intervening signals from the eNB 104 (e.g., RACH message 2, etc.). Thus, a two-step RACH procedure is implemented.

Figure 5B:
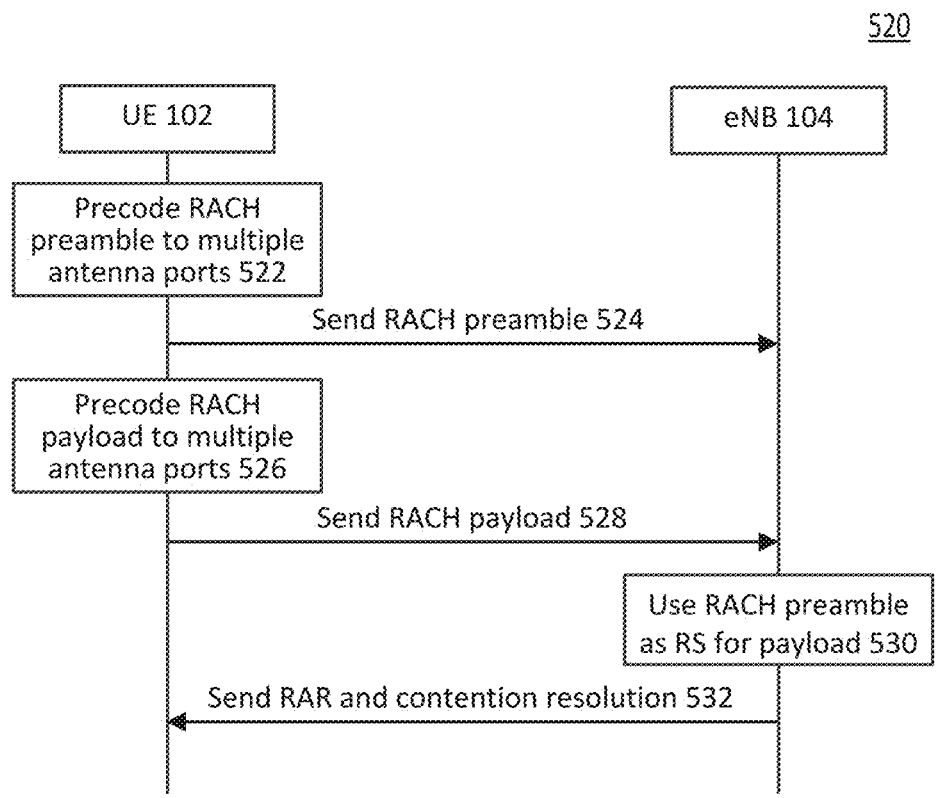
FIG. 5B is a timing diagram of an exemplary two-step RACH procedure in uplink communication according to embodiments of the present disclosure.

FIG. 5B is a timing diagram of an exemplary two-step RACH procedure 520 in uplink communication according to embodiments of the present disclosure. The RACH procedure 520 illustrates the protocol relationship between the UE 102 and the eNB 104 for the two-step RACH procedure discussed above. Although illustrated as between a specific UE 102 and eNB 104, this may occur between any number of UEs 102 and eNBs 104. These two are used for illustration and simplicity of discussion.

At action 522, the UE 102 precodes a RACH preamble to multiple antenna ports, for example including the RACH preamble selection, splitting, etc. as discussed with respect to the figures above.

At action 524, the UE 102 sends the RACH preamble to the eNB 104 via the multiple antenna ports. This is transmitted via a physical random access channel (PRACH).

At action 526, the UE 102 precodes a RACH payload to multiple antenna ports as well, for example including the information and splitting as discussed with respect to the figures above.

At action 528, the UE 102 sends the RACH payload to the eNB 104 via the multiple antenna ports as well, e.g. via the PRACH. Thus, what was typically sent via message 1 and message 3 at different times (i.e., with intervening traffic from the eNB 104) is now combined by the UE 102 as a single message transmitted to the eNB 104. The RACH payload may include the UE-ID and other information such as a buffer status report and a scheduling request.

At action 530, the eNB 104 may use the RACH preamble received from action 524 as a reference signal for the RACH payload (e.g., used to characterize/estimate the channels and improve reception and recovery of the RACH payload).

At action 532, the eNB 104 responds with the random access response (RAR) and contention resolution information. This response may include, for example, the identifier of the RACH preamble, a timing advance (TA), a back off indicator, a contention resolution messages, UL/DL grant, and a transmit power control (TPC) commands Thus, what was typically sent via message 2 and message 4 is now combined by the eNB 104 as a single message transmitted to the UE 102 in response.

Figure 6:
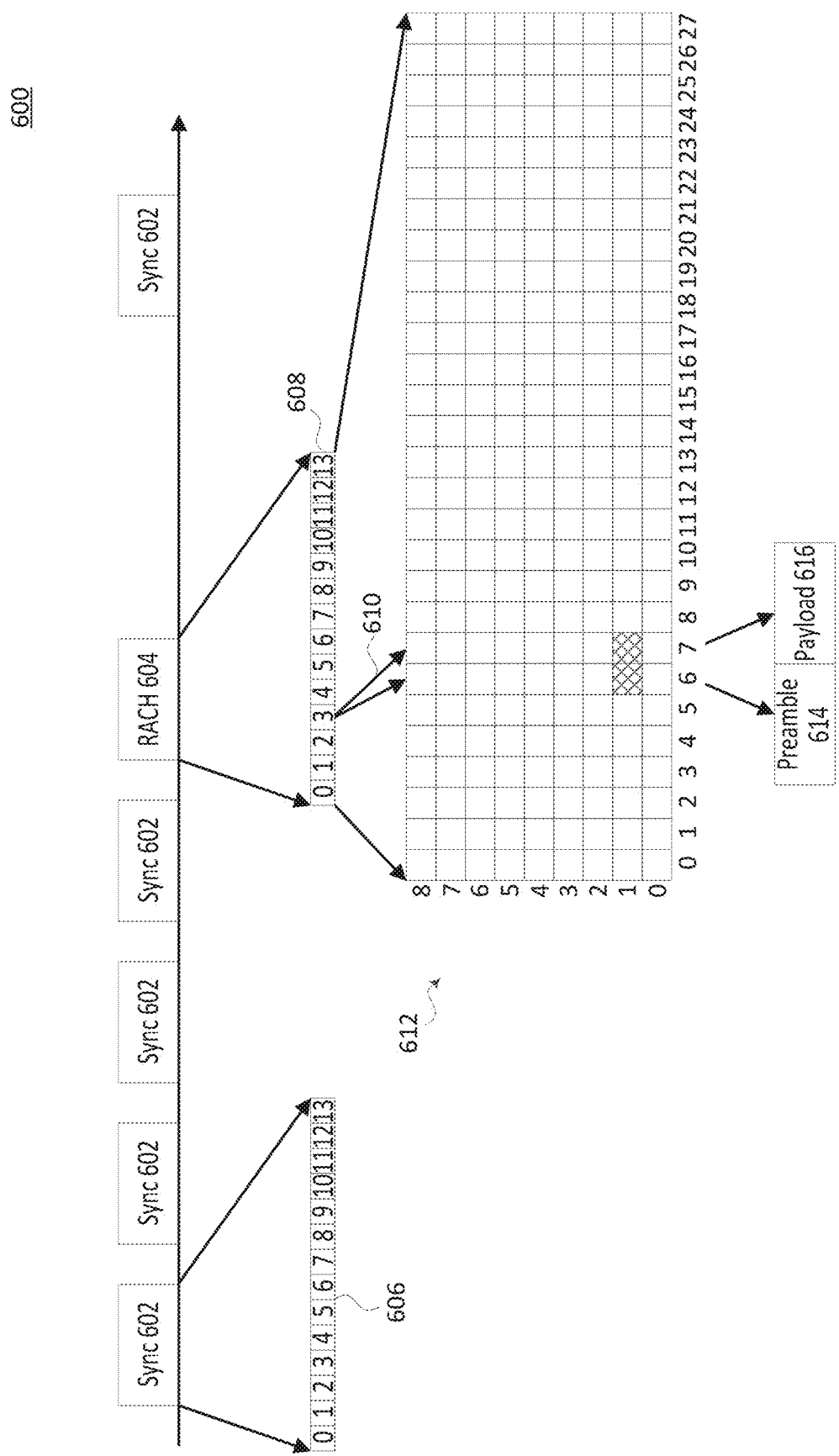
FIG. 6 is a block diagram of an exemplary two-step RACH procedure in uplink communication according to embodiments of the present disclosure.

FIG. 6 is a block diagram of an exemplary two-step RACH procedure 600 in uplink communication according to embodiments of the present disclosure. The two-step RACH procedure 600 provides more context to the examples given above and may be illustrative of use in certain scenarios, for example in mmW applications to name just one example.

As illustrated, a plurality of reference signals, referred to here as synchronization ("sync") messages 602 are transmitted from the eNB 104. In some embodiments, the eNB 104 may transmit each sync message 602 with symbols 606 lumped into groups of two (since the two-step RACH procedure according to embodiments of the present disclosure may use two symbols of the RACH preamble/RACH payload transmission to the eNB 104). Each sync message 602 may include, for example, a number of symbols in the groups of two. As illustrated, the symbols 606 of the sync messages 602 are provided with 14 groups (e.g., 14 different beam directions)—thus, a total of 28 symbols as each group has two symbols in it.

The UE 102 receiving the sync messages 602 may analyze the signal qualities of the groups of two and select the group with the highest signal quality from among the different groups' signal qualities. In the illustrated example, for the RACH procedure 604, the UE 102 selects from the symbols 608 the group 3, which corresponds to symbols 6 and 7 (illustrated with arrows 610) out of 28 total symbols in the resource block 612. This represents a situation where, in the sync messages 602, the symbol group 3 was found to have the best signal qualities from among the set.

In symbol 6, the UE 102 may place the RACH preamble 614 for a RACH procedure, while in symbol 7 the UE 102 may place the RACH payload 616. Thereby, the UE 102 may transmit the RACH preamble 614 and RACH payload 616 sequentially before receiving any response from the eNB 104. This shortens the RACH procedure to a two-step procedure. Further, the RACH preamble 614 may function as the reference signal for the RACH payload 616 as noted above.

Figure 7A:
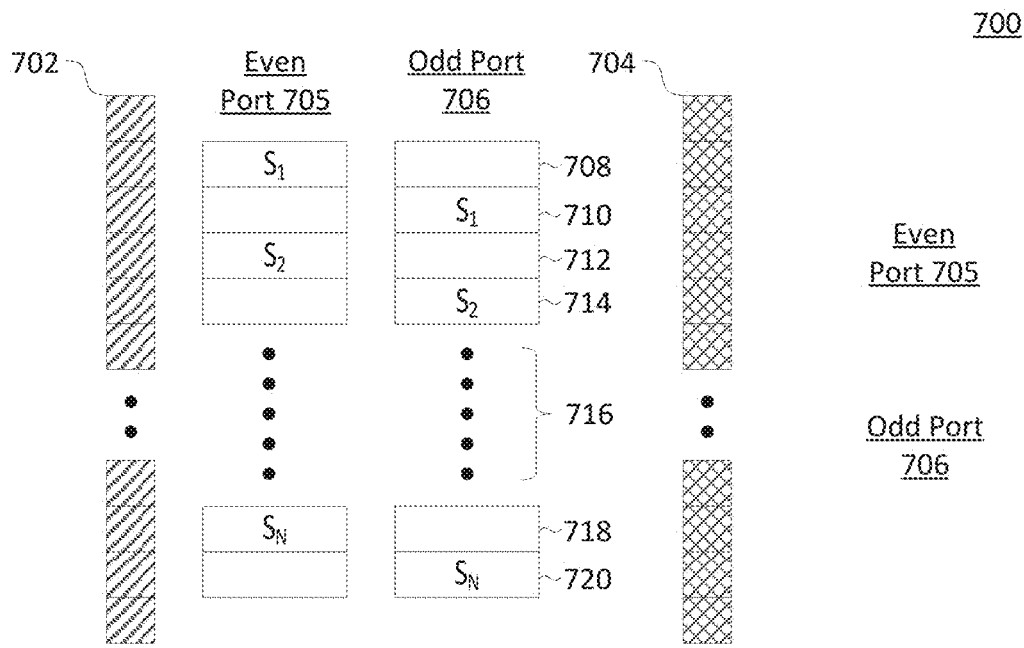
FIG. 7A is a block diagram of an exemplary multi-port multiplexing approach in uplink RACH communication according to embodiments of the present disclosure.

Turning now to FIG. 7A, block diagram is illustrated of an exemplary multi-port multiplexing approach 700 in uplink RACH communication according to embodiments of the present disclosure. In some embodiments, this is illustrating the RACH preamble multiplexing.

In particular, the multiplexing approach 700 illustrates the frequency division multiplexing approach, introduced above, of a signal S. The preamble 702 may be spread among a plurality of frequency tones (along the vertical spectrum illustrated in FIG. 7A) among a plurality of ports. The example of FIG. 7A continues the example of a UE 102 with two antenna ports, identified here as an even port 705 (also referred to as a first port 705 herein) and an odd port 706 (also referred to as a second port 706 herein). The designation of the even and odd ports may be arbitrary.

Under the FDM approach, the UE 102 places a first copy of the RACH preamble, $S_1$, for even port 705 at frequency tone 708. The UE 102 does not place the second copy of the RACH preamble $S_1$ for the odd port 706 at the same frequency tone 708. Instead, the UE 102 places the second copy of $S_1$ for the odd port 706 at a non-overlapping frequency 710. Thus, the different ports 705, 706 transmit their copies of the RACH preamble from different, non-overlapping frequency tones. In like manner, subsequent RACH preamble signals $S_2$ through $S_N$ are transmitted on non-overlapping tones 712, 714 ($S_2$) and 718, 720 ($S_N$) with any number of tones/signals 716 therebetween.

FIG. 7A further illustrates the payload 704, which may be transmitted, via the even port 705 and odd port 706, using SFBC or some other approach to ensure that the receiving eNB 104 is able to distinguish the different channels used to transmit the RACH payload. In some alternative embodiments, the payload 704 may use FDM or spreading in similar manner as discussed above.

Figure 7B:
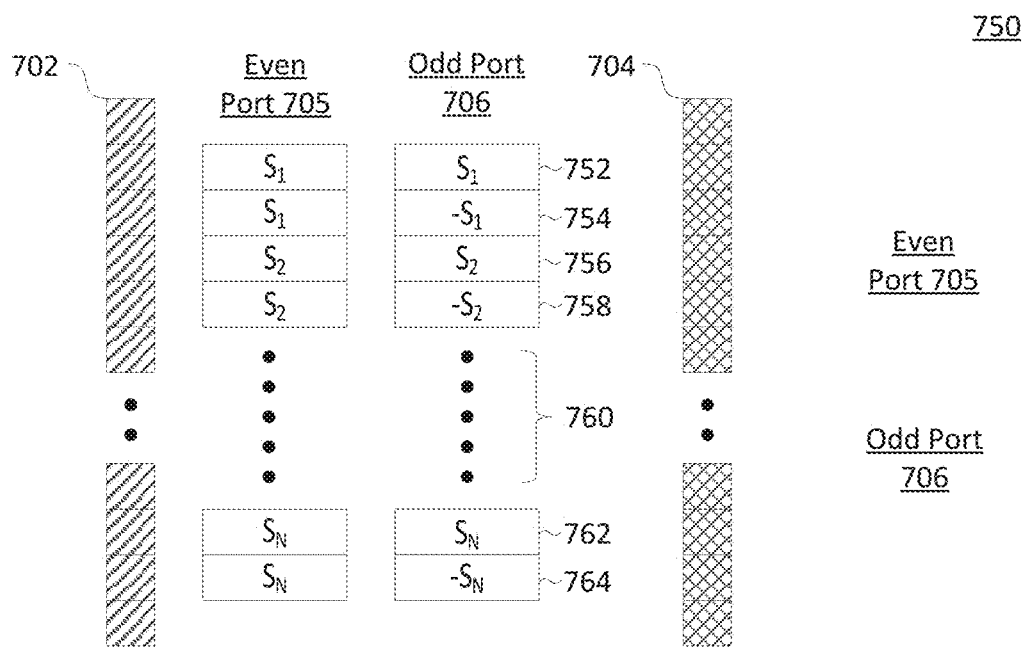
FIG. 7B is a block diagram of an exemplary multi-port multiplexing approach in uplink RACH communication according to embodiments of the present disclosure.

FIG. 7B is a block diagram of an exemplary multi-port multiplexing approach 750 in uplink RACH communication according to embodiments of the present disclosure.

In particular, the multiplexing approach 750 illustrates the spreading multiplexing approach, introduced above, of a signal S. The preamble 702 may be spread among a plurality of frequency tones among a plurality of ports in a manner that results in overlapping frequency tone use. The example of FIG. 7B also continues the example of a UE 102 with two antenna ports, identified here as an even port 705 and an odd port 706 (as identified in FIG. 7A).

Under the spreading approach, the UE 102 places a first copy of the RACH preamble, $S_1$, for even port 705 at frequency tone 752. The UE 102 also places the second copy of the RACH preamble $S_1$ for the odd port 706 at the same frequency tone 754. Also, the UE 102 places an additional copy of $S_1$ for the even port 705 at a different frequency tone 754, and yet another copy for the odd port 706 at the same frequency tone 754. However, this copy for odd port 706 at frequency tone 754 may be modified by changing the sign of the transmission to aid the eNB 104 in distinguishing channels upon receipt. Thus, in this example the spreading code used by the UE 102 may constitute the sequence [+1 +1] for the even antenna port 705 and [+1 −1] for the odd antenna port 706 (other permutations are possible as well). The UE 102 may use a CDMA scheme for spreading. Although the last copy is shown as the one being modified, any of the copies may instead, or additionally, be modified in similar manner.

Thus, in FIG. 7B the different ports 705, 706 transmit their copies of the RACH preamble from overlapping frequency tones, but with at least one of the copies modified in some discernible way. In like manner, subsequent RACH preamble signals $S_2$ through $S_N$ are transmitted on tones 756, 758 ($S_2$) and 762, 764 ($S_N$) with any number of tones/signals 760 therebetween.

FIG. 7B further illustrates the payload 704, while like in FIG. 7A may be transmitted, via the even port 705 and the odd port 706, using SFBC or some other approach, such as spreading as discussed above.

Figure 8:
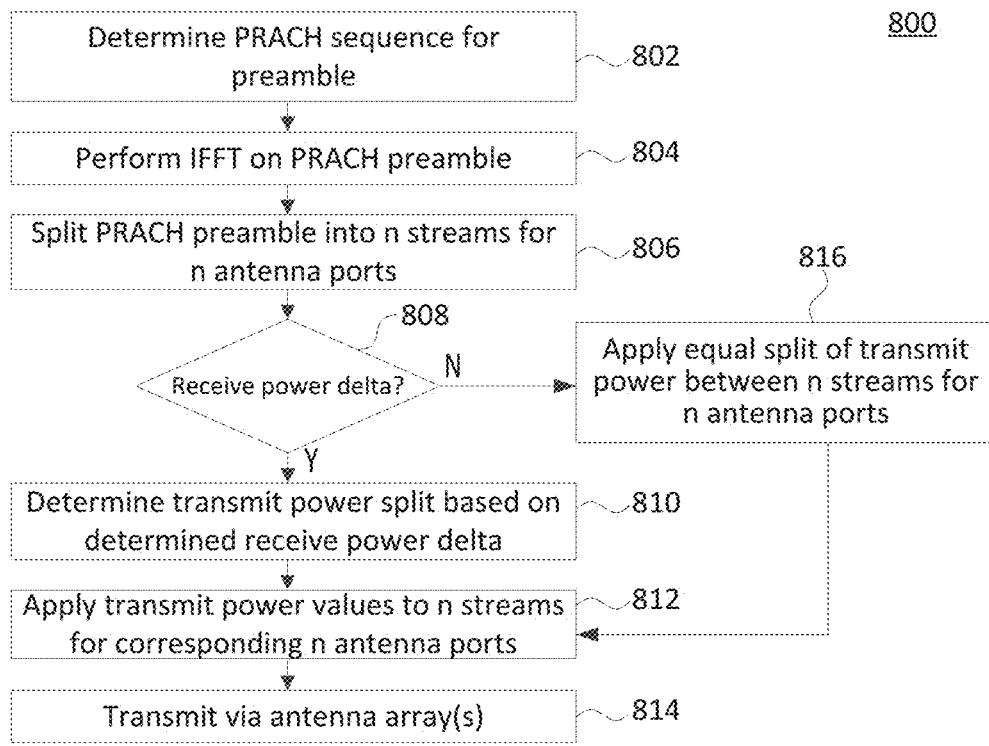
FIG. 8 is a flowchart illustrating an exemplary method for wireless communication in accordance with various aspects of the present disclosure.

Turning now to FIG. 8, and focusing first on aspects relating to RACH preamble transmission using multiple antenna ports, a flowchart is illustrated of an exemplary method 800 for wireless communication in accordance with various aspects of the present disclosure. In particular, the method 800 illustrates the use of multiple antenna ports for transmitting RACH preambles according to embodiments of the present disclosure. Method 800 may be implemented by a given UE 102 (any number of UEs 102, with focus on one for simplicity of discussion herein). It is understood that additional steps can be provided before, during, and after the steps of method 800, and that some of the steps described can be replaced or eliminated from the method 800.

At block 802, the UE 102 determines a random access sequence (also referred to as a RACH sequence) to be used for the RACH preamble it transmits to the eNB 104. The determination may be a lookup for an assigned sequence in contention-free embodiments or a random selection from those available in contention-based embodiments.

At block 804, the UE 102 performs an IFFT on the random access sequence selected at block 802.

At block 806, the UE 102 splits the stream of data carrying the determined random access sequence into a number n of streams equaling the number n of antenna ports (e.g., two or more) for the UE 102. This may be done at a precoder of the UE 102, in which case further precoding may occur as configured for the UE 102.

At decision block 808, if there was a difference detected (also referred to as a receive power delta) by the UE 102 previously in the receive power of received downlink reference signals, referred to here as synchronization signals (such as primary synchronization signals and secondary synchronization signals) in the n streams corresponding to the n antenna ports, then the method 800 proceeds to block 810.

At block 810, the UE 102 determines how to split the transmit power between the n antenna ports (e.g., two ports) based on the difference in receive power of the n receiving streams detected previously, e.g. so that the port with higher receive power has a higher share of the transmit power.

Returning to decision block 808, if no difference was detected, or a difference was detected but the UE 102 is set to keep the transmit power the same for each antenna port, then the method 800 proceeds to block 816. At block 816, the UE 102 applies an equal split of transmit power between the antenna ports.

Whether from block 810 or block 816, the method 800 proceeds to block 812. At block 812, the UE 102 applies the transmit power values to the RACH preamble according to the values determined for the respective streams of the respective antenna ports.

At block 814, the UE 102 transmits the RACH preambles from the antenna arrays of the UE 102, e.g. according to a mapping of the n antenna ports to one or more physical antenna arrays.

Figure 9:
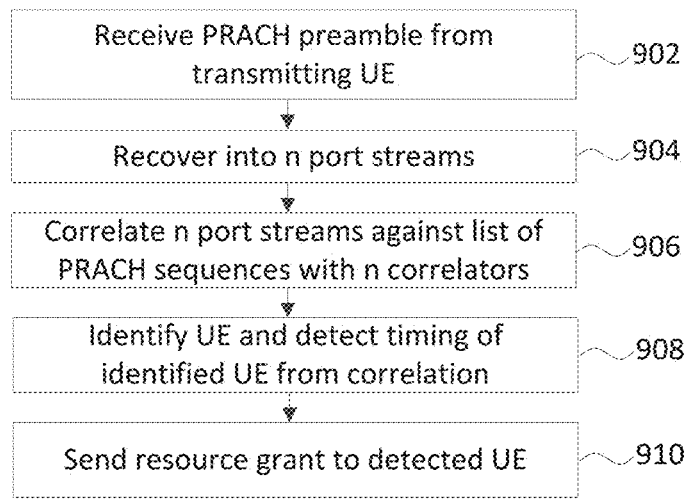
FIG. 9 is a flowchart illustrating an exemplary method for wireless communication in accordance with various aspects of the present disclosure.

Turning now to FIG. 9, a flowchart is illustrated of an exemplary method 900 for wireless communication in accordance with various aspects of the present disclosure. In particular, the method 900 illustrates the reception and recovery of RACH preambles using multiple antenna ports according to embodiments of the present disclosure. Method 900 may be implemented by an eNB 104 (any number of eNBs 104 in communication with any number of UEs 102, focusing on one for simplicity of discussion here). It is understood that additional steps can be provided before, during, and after the steps of method 900, and that some of the steps described can be replaced or eliminated from the method 900.

At block 902, the eNB 104 receives a RACH preamble from a transmitting UE 102, for example by a plurality of antennae at the eNB 104.

At block 904, the eNB 104 recovers the received RACH preamble into the same number of streams corresponding to the antenna ports. The recovered RACH preamble is decoded and supplied in the n streams to n corresponding correlators.

At block 906, the n corresponding correlators correlate the RACH preamble in their respective stream against the available random access sequences.

At block 908, the results of block 906 from the correlators are summed and used by the eNB 104 to identify the UE (or preamble ID associated with the RACH preamble) and detect timing of the UE. As a result of this, the eNB 104 may send a random access response to the UE 102, e.g. a resource grant, at block 910.

Figure 10:
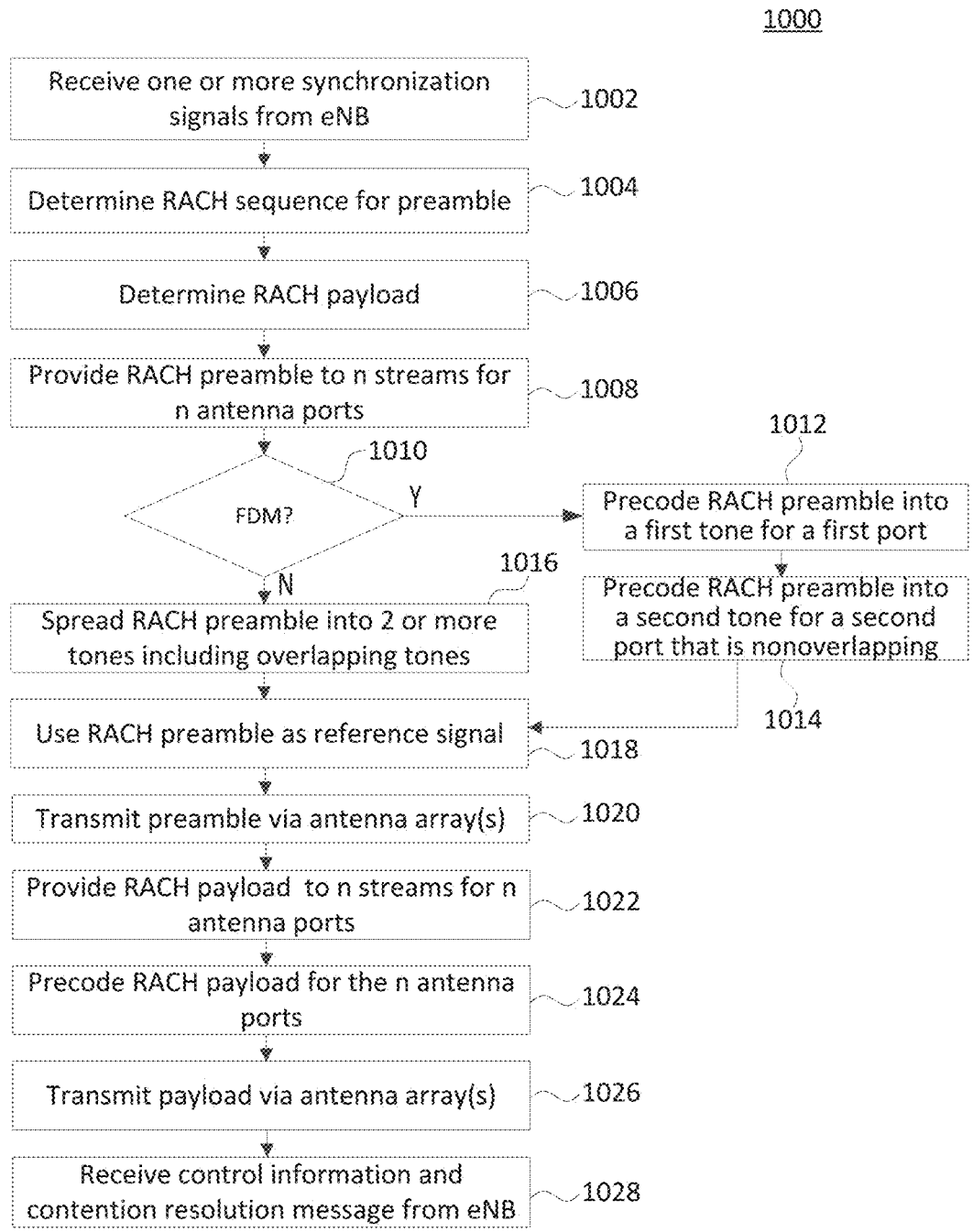
FIG. 10 is a flowchart illustrating an exemplary method for wireless communication in accordance with various aspects of the present disclosure.

Turning now to FIG. 10, a flowchart is illustrated of an exemplary method 1000 for wireless communication in accordance with various aspects of the present disclosure. In particular, the method 1000 illustrates the use of multiple antenna ports for transmitting RACH preambles and RACH payloads in two-step RACH procedures according to embodiments of the present disclosure. Method 1000 may be implemented by a given UE 102 (any number of UEs 102, with focus on one for simplicity of discussion herein). It is understood that additional steps can be provided before, during, and after the steps of method 1000, and that some of the steps described can be replaced or eliminated from the method 1000.

At block 1002, UE 102 receives one or more reference signals, referred to here as synchronization signals from one or more eNBs 104. For example, each synchronization signal may include one or more beamformed symbols that may be beamformed in different directions.

At block 1004, the UE 102 determines a random access sequence (also referred to as a RACH preamble) to be used for the RACH preamble it transmits to the eNB 104. The determination may be a lookup for an assigned sequence in contention-free embodiments or a random selection from those available in contention-based embodiments.

At block 1006, the UE 102 determines a RACH payload for transmission to the eNB 104. The RACH payload may include, for example, an RRC connection request, a tracking area update, a scheduling request, etc. This may be may be from a memory as well or from some other source.

At block 1008, the UE 102 provides the RACH preamble to n different streams for n different antenna ports. For example, the UE 102 may split (e.g., copy) the stream of data carrying the determined RACH preamble into a number n of streams equaling the number n of antenna ports (e.g., two or more) for the UE 102. This may be done at a precoder of the UE 102, in which case further precoding may occur as configured for the UE 102.

At decision block 1010, it is determined whether the UE 102 uses FDM to multiplex the RACH preamble to the antenna ports. If FDM is used, then the method 800 proceeds to block 1012.

At block 1012, the UE 102 precodes the RACH preamble into a first tone for a first port.

At block 1014, the UE 102 precodes the RACH preamble into a second tone for the second port. The second tone is non-overlapping with the first tone. Method 1000 continues with the example of a two-antenna-port embodiment, though any number of ports may be used, in which case each of the ports would have the RACH preamble placed to a different tone that is non-overlapping with the other tones used.

The method 1000 proceeds from block 1014 to block 1018. At block 1018, the UE 102 may use the RACH preamble as a reference signal for the subsequent RACH payload, and therefore forego inclusion of a formal RS. In other embodiments, the UE 102 may use an actual RS.

Returning to decision block 1010, if the UE 102 does not use FDM for multiplexing, but instead a spreading approach, the method 1000 proceeds from decision block 1010 to block 1016.

At block 1016, the UE 102 spreads the RACH preamble into 3 or more tones, where the tones are overlapping, and where at least one copy of the RACH preamble has a change, such as a sign value change, to assist in subsequent identification. For example, the RACH preamble may be copied on the same tone for both antenna ports, as well as on an additional tone for both antenna ports, with one of the copies changed in sign.

The method 1000 proceeds to block 1018, as laid out above. From block 1018, the method 1000 proceeds to block 1020.

At block 1020, the UE 102 transmits the RACH preambles from the antenna arrays of the UE 102, such as according to a mapping of the n antenna ports to one or more physical antenna arrays.

At block 1022, the UE 102 provides a RACH payload to the n different streams for n different antenna ports. For example, the UE 102 may split (e.g., copy) the stream of data carrying the determined RACH payload into a number n of streams equaling the number n of antenna ports (e.g., two or more) for the UE 102, just as described with respect to the RACH preamble above.

At block 1024, the UE 102 precodes the RACH payload, for example using SFBC or an alternative approach.

At block 1026, the UE 102 transmits the RACH payload from the antenna arrays of the UE 102, such as according to a mapping of the n antenna ports to one or more physical antenna arrays.

At block 1028, the UE 102 receives control information, random access response, and contention resolution in a message from eNB 104, e.g. in a combined message that may include an identifier of the RACH preamble, a timing advance, an uplink grant, cell radio network temporary identifier (C-RNTI), and backoff indicator to name some examples, as well as a response to the RRC connection request of the RACH payload that may include the contention resolution message.

Figure 11:
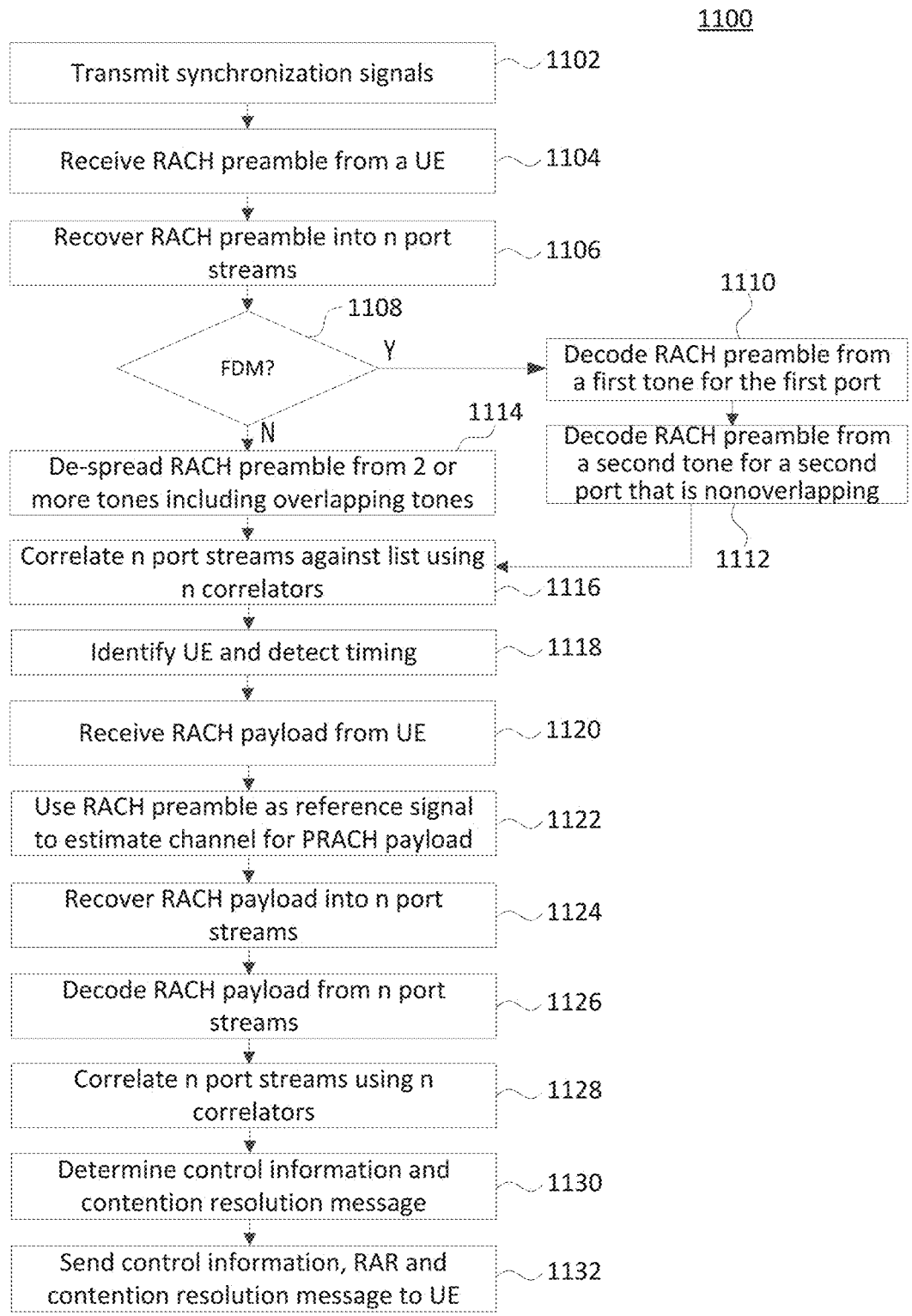
FIG. 11 is a flowchart illustrating an exemplary method for wireless communication in accordance with various aspects of the present disclosure.

Turning now to FIG. 11, a flowchart is illustrated of an exemplary method 1100 for wireless communication in accordance with various aspects of the present disclosure. In particular, the method 1100 illustrates the reception and recovery of RACH preambles and RACH payloads in two-step RACH procedures using multiple antenna ports according to embodiments of the present disclosure. Method 1100 may be implemented by an eNB 104 (any number of eNBs 104 in communication with any number of UEs 102, focusing on one for simplicity of discussion here). It is understood that additional steps can be provided before, during, and after the steps of method 1100, and that some of the steps described can be replaced or eliminated from the method 1100.

At block 1102, the eNB 104 transmits one or more reference signals, referred to here as synchronization signals (e.g., broadcasts the signals). For example, the eNB 104 may beamform one or more symbols in each synchronization signal in different directions.

At block 1104, the eNB 104 receives a RACH preamble from a UE 102, for example by a plurality of antennae at the eNB 104.

At block 1106, the eNB 104 recovers the received RACH preamble into the same number of streams corresponding to the number of antenna ports used at the UE 102.

At decision block 1108, if the UE 102 had used FDM, then the method 1100 proceeds to block 1110.

At block 1110, the eNB 104 decodes the RACH preamble from a first tone corresponding to a first antenna port (continuing with the examples above of a two-port use at the UE 102).

At block 1112, the eNB 104 decodes the RACH preamble from a second tone corresponding to a second antenna port of the UE 102.

Returning to decision block 1108, if the UE had used spreading for the multiplexing, then the method 1100 proceeds to block 1114.

At block 1114, the eNB 104 decodes the RACH preamble from 3 or more tones, where the tones are overlapping, and where at least one copy of the RACH preamble had a change, such as a sign value change, to assist in the eNB 104's identification. For example, the RACH preamble may be decoded from the same tone for both antenna ports, as well as on an additional tone for both antenna ports, with one of the copies changed in sign.

From either block 1112 or 1114, the method 1100 proceeds to block 1116.

At block 1116, the eNB 104 supplies the recovered RACH preamble in the n streams to n corresponding correlators that correlate the RACH preamble in their respective stream against the available random access sequences.

At block 1118, the results of block 1116 from the correlators are summed and used by the eNB 104 to identify the UE 102 (or preamble ID associated with the RACH preamble) and detect timing of the UE 102.

At block 1120, the eNB 104 further receives a RACH payload from the UE 102, for example directly subsequent to receipt of the RACH preamble from the UE 102.

At block 1122, the eNB 104 may use the RACH preamble as a reference signal for the RACH payload received at block 1120, and instead of a formal RS. In other embodiments, the UE 102 may have used an actual RS. Thus, the eNB 104 may estimate the channel using the RACH preamble received prior to the RACH payload.

At block 1124, the eNB 104 recovers the RACH payload into the n streams.

At block 1126, the eNB 104 decodes the RACH payload in the n streams, for example using SFBC corresponding to n antenna ports (or other multiplexing scheme where used).

At block 1128, the eNB 104 supplies the recovered RACH payload in the n streams to n corresponding correlators.

At block 1130, the eNB 104 determines control information that may include an identifier of the RACH preamble, a timing advance, an uplink grant, cell radio network temporary identifier (C-RNTI), and backoff indicator to name some examples, as well as a response to the RRC connection request of the RACH payload that may include a contention resolution message.

At block 1132, the eNB 104 transmits the control information with RAR and contention resolution message in a combined message to the UE 102, thereby reducing the typical four-step RACH procedure to a two-step RACH procedure while also allowing the use of multiple antenna ports by the UE 102.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a computer-readable medium having program code recorded thereon, the program code comprising code for causing a first wireless communications device to provide a random access channel (RACH) preamble to a first antenna port of the first wireless communications device and to a second antenna port of the first wireless communications device. The program code further comprises code for causing the first wireless communications device to provide a RACH payload to the first antenna port and to the second antenna port. The program code further comprises code for causing the first wireless communications device to transmit the RACH preamble and the RACH payload as provided to the first and second antenna ports to a second wireless communications device.

The computer-readable medium further includes code for causing the first wireless communications device to transmit the RACH preamble prior to the RACH payload in a common message. The computer-readable medium further includes code for causing the first wireless communications device to receive, from the second wireless communications device, a message comprising control information, a random access response, and a connection resolution message, the message being in response to the common message. The computer-readable medium further includes code for causing the first wireless communications device to provide the RACH preamble as a reference signal to the second wireless communications device for use with the RACH payload. The computer-readable medium further includes code for causing the first wireless communications device to precode the RACH preamble into a first frequency tone for transmission from a first physical antenna port and a second frequency tone for transmission from a second physical antenna port, the first and second frequency tones being non-overlapping to each other. The computer-readable medium further includes code for causing the first wireless communications device to spread each component of the RACH preamble into two or more tones. The computer-readable medium further includes wherein the code for causing the first wireless communications device to spread the RACH preamble comprises code for causing the first wireless communications device to spread using code division multiplexing. The computer-readable medium further includes wherein a spreading code used for the code division multiplexing comprises [+1 +1] for the first antenna port and [+1 −1] for the second antenna port. The computer-readable medium further includes code for causing the first wireless communications device to determine a beam from among a plurality of beams used for synchronization signals from the second wireless communications device to use for the transmitting. The computer-readable medium further includes code for causing the first wireless communications device to use a first symbol from among a plurality of symbols associated with the beam for transmitting the RACH preamble, and code for causing the first wireless communications device to use a second symbol from among the plurality of symbols associated with the beam for transmitting the RACH payload. The computer-readable medium further includes wherein the first and second wireless communication devices communicate using millimeter-wave frequencies.

Embodiments of the present disclosure further include a computer-readable medium having program code recorded thereon, the program code comprising code for causing a first wireless communications device to receive a random access channel (RACH) preamble from a second wireless communications device, wherein the RACH preamble was split into first and second antenna ports. The program code further comprises code for causing the first wireless communications device to receive a RACH payload from the second wireless communications device, wherein the RACH payload was split into the first and second antenna ports. The program code further comprises code for causing the first wireless communications device to recover first and second data streams corresponding to the first and second antenna ports for the RACH preamble and third and fourth data streams corresponding to the first and second antenna ports for the RACH payload. The program code further comprises code for causing the first wireless communications device to determine an identity of the second wireless communications device and a response message based on the recovering the first and second, and third and fourth, data streams.

The computer-readable medium further includes code for causing the first wireless communications device to receive the RACH preamble prior to the RACH payload in a common message. The computer-readable medium further includes code for causing the first wireless communications device to estimate a channel between the first and second wireless communications devices based on the RACH preamble functioning as a reference signal. The computer-readable medium further includes code for causing the first wireless communications device to transmit, in response to the common message, the response message to the second wireless communications device, the response message comprising control information, a random access response, and a connection resolution message. The computer-readable medium further includes wherein the recovering further comprises code for causing the first wireless communications device to decode the RACH preamble from a first frequency tone and a second frequency tone that are non-overlapping to each other. The computer-readable medium further includes wherein the recovering further comprises code for causing the first wireless communications device to despread each component of the RACH preamble from two or more tones. The computer-readable medium further includes wherein the RACH preamble was spread using code division multiplexing. The computer-readable medium further includes wherein a spreading code used for the code division multiplexing comprises [+1 +1] for the first antenna port and [+1 −1] for the second antenna port. The computer-readable medium further includes code for causing the first wireless communications device to broadcast a synchronization signal using a plurality of beams, wherein the receiving the RACH preamble and the RACH payload is received on a beam from the plurality of beams. The computer-readable medium further includes wherein the RACH preamble is included with a first symbol from among a plurality of symbols associated with the beam, and the RACH payload is included with a second symbol from among the plurality of symbols associated with the beam. The computer-readable medium further includes wherein the first and second wireless communications devices communicate using millimeter-wave frequencies.

Embodiments of the present disclosure further include an apparatus comprising means for providing a random access channel (RACH) preamble to a first antenna port of the apparatus and to a second antenna port of the apparatus. The apparatus further comprises means for providing a RACH payload to the first antenna port and to the second antenna port. The apparatus further comprises means for transmitting the RACH preamble and the RACH payload as provided to the first and second antenna ports to a wireless communications device.

The apparatus further includes means for transmitting the RACH preamble prior to the RACH payload in a common message. The apparatus further includes means for receiving, from the wireless communications device, a message comprising control information, a random access response, and a connection resolution message, the message being in response to the common message. The apparatus further includes means for providing the RACH preamble as a reference signal to the wireless communications device for use with the RACH payload. The apparatus further includes means for precoding the RACH preamble into a first frequency tone for transmission from a first physical antenna port and a second frequency tone for transmission from a second physical antenna port, the first and second frequency tones being non-overlapping to each other. The apparatus further includes means for spreading each component of the RACH preamble into two or more tones. The apparatus further includes wherein the means for spreading the RACH preamble comprises means for spreading using code division multiplexing. The apparatus further includes wherein a spreading code used for the code division multiplexing comprises [+1 +1] for the first antenna port and [+1 −1] for the second antenna port. The apparatus further includes means for determining a beam from among a plurality of beams used for synchronization signals from the wireless communications device to use for the transmitting. The apparatus further includes means for using a first symbol from among a plurality of symbols associated with the beam for transmitting the RACH preamble, and means for using a second symbol from among the plurality of symbols associated with the beam for transmitting the RACH payload. The apparatus further includes wherein the apparatus and wireless communication devices communicate using millimeter-wave frequencies.

Embodiments of the present disclosure further include an apparatus comprising means for receiving a random access channel (RACH) preamble from a wireless communications device, wherein the RACH preamble was split into first and second antenna ports. The apparatus further comprises means for receiving a RACH payload from the wireless communications device, wherein the RACH payload was split into the first and second antenna ports. The apparatus further comprises means for recovering first and second data streams corresponding to the first and second antenna ports for the RACH preamble and third and fourth data streams corresponding to the first and second antenna ports for the RACH payload. The apparatus further comprises means for determining an identity of the wireless communications device and a response message based on the recovering the first and second, and third and fourth, data streams.

The apparatus further includes means for receiving the RACH preamble prior to the RACH payload in a common message. The apparatus further includes means for estimating a channel between the apparatus and the wireless communications devices based on the RACH preamble functioning as a reference signal. The apparatus further includes means for transmitting, in response to the common message, the response message to the wireless communications device, the response message comprising control information, a random access response, and a connection resolution message. The apparatus further includes wherein the means for recovering further comprises means for decoding the RACH preamble from a first frequency tone and a second frequency tone that are non-overlapping to each other. The apparatus further includes wherein the means for recovering further comprises means for despreading each component of the RACH preamble from two or more tones. The apparatus further includes wherein the RACH preamble was spread using code division multiplexing. The apparatus further includes wherein a spreading code used for the code division multiplexing comprises [+1 +1] for the first antenna port and [+1 −1] for the second antenna port. The apparatus further includes means for broadcasting a synchronization signal using a plurality of beams, wherein the receiving the RACH preamble and the RACH payload is received on a beam from the plurality of beams. The apparatus further includes wherein the RACH preamble is included with a first symbol from among a plurality of symbols associated with the beam, and the RACH payload is included with a second symbol from among the plurality of symbols associated with the beam. The apparatus further includes wherein the apparatus and the wireless communications devices communicate using millimeter-wave frequencies.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
 receiving, by a first wireless communications device, one or more synchronization signals on a plurality of beams from a second wireless communications device;
 providing, by the first wireless communications device, a random access channel (RACH) preamble to a first antenna port of the first wireless communications device and to a second antenna port of the first wireless communications device for transmission to the second wireless communications device;
 providing, by the first wireless communications device, a RACH payload to the first antenna port and the second antenna port for transmission to the second wireless communications device;
 transmitting, by the first wireless communications device, the RACH preamble provided to the first and second antenna ports to the second wireless communications device without the RACH payload; and transmitting, by the first wireless communications device, the RACH payload provided to the first and second antenna ports to the second wireless communications device without the RACH preamble, wherein the RACH preamble and the RACH payload are beamformed for the transmitting based on one or more beams from among the plurality of beams on which the one or more synchronization signals were received.

2. The method of claim 1, wherein the transmitting comprises transmitting, by the first wireless communications device, the RACH payload as provided to the first and second antenna ports to the second wireless communications device after transmitting the RACH preamble as provided to the first and second antenna ports as part of a two-step RACH procedure.

3. The method of claim 2, further comprising:
receiving, by the first wireless communications device from the second wireless communications device, a message comprising control information, a random access response, and a connection resolution message, the message being in response to both the RACH preamble and the RACH payload and as part of the two-step RACH procedure.

4. The method of claim 2, further comprising:
providing, by the first wireless communications device, the RACH preamble as a reference signal to the second wireless communications device for use with the RACH payload.

5. The method of claim 2, further comprising:
determining, by the first wireless communications device, the one or more beams associated with a direction having a highest signal quality corresponding to the synchronization signals received from the second wireless communications device;
using, by the first wireless communications device, a first symbol from among a plurality of symbols associated with the one or more beams for transmitting the RACH preamble; and
using, by the first wireless communications device, a second symbol from among the plurality of symbols associated with the one or more beams for transmitting the RACH payload.

6. The method of claim 1, further comprising:
precoding, by the first wireless communications device, the RACH preamble into a first frequency tone for transmission from a first physical antenna port and a second frequency tone for transmission from a second physical antenna port, the first and second frequency tones being non-overlapping to each other.

7. The method of claim 1, further comprising:
spreading, by the first wireless communications device before the transmitting the RACH preamble, each component of the RACH preamble into two or more tones at both the first and second antenna ports.

8. The method of claim 1, further comprising:
determining, by the first wireless communications device, a receive power delta between the first and second antenna ports during reception of a signal from the second wireless communications device;
determining, by the first wireless communications device, a split configuration between the first and second antenna ports using the receive power delta; and
splitting, by the first wireless communications device, a transmit power for the first wireless communications device between the first and second antenna ports according to the split configuration.

9. A method, comprising:
transmitting, by a first wireless communications device, one or more synchronization signals on a plurality of beams to a second wireless communications device;
receiving, at the first wireless communications device, a random access channel (RACH) preamble from the second wireless communications device, the RACH preamble having been conveyed through first and second antenna ports;
receiving, at the first wireless communications device, a RACH payload from the second wireless communications device, the RACH payload having been conveyed through the first and second antenna ports, the RACH preamble and the RACH payload having been beamformed based on one or more beams from among the plurality of beams on which the one or more synchronization signals were transmitted;
recovering, by the first wireless communications device, first and second data streams corresponding to the first and second antenna ports for the RACH preamble, and third and fourth data streams corresponding to the first and second antenna ports for the RACH payload; and
determining, by the first wireless communications device, an identity of the second wireless communications device based on the receiving the RACH preamble through the first and second antenna ports and the recovering the first and second data streams.

10. The method of claim 9, further comprising:
receiving, by the first wireless communications device, the RACH preamble prior to receiving the RACH payload as part of a two-step RACH procedure; and
determining, by the first wireless communications device, a response message based on the recovering the third and fourth data streams.

11. The method of claim 10, further comprising:
estimating, by the first wireless communications device, a channel between the first and second wireless communications devices based on the RACH preamble functioning as a reference signal.

12. The method of claim 10, further comprising:
transmitting, by the first wireless communications device in response to both the RACH preamble and the RACH payload and as part of the two-step RACH procedure, the response message to the second wireless communications device, the response message comprising control information, a random access response, and a connection resolution message.

13. The method of claim 10,
wherein the RACH preamble is included with a first symbol from among a plurality of symbols associated with the one or more beams, and the RACH payload is included with a second symbol from among the plurality of symbols associated with the one or more beams.

14. The method of claim 9, wherein the recovering further comprises:
decoding, by the first wireless communications device, the RACH preamble from a first frequency tone and a second frequency tone that are non-overlapping to each other.

15. The method of claim 9, wherein the recovering further comprises:

despreading, by the first wireless communications device, each component of the RACH preamble from two or more tones from both the first and second antenna ports.

16. The method of claim 9, further comprising:
detecting, by the first wireless communications device, a transmit power of the received RACH preamble as split between the first and second antenna ports, wherein the transmit power is based on a power of a prior signal from the first wireless communications device as received at the second wireless communications device.

17. An apparatus, comprising:
first and second antenna ports;
a processor configured to provide a random access channel (RACH) preamble to the first antenna port and to the second antenna port, and to provide a RACH payload to the first antenna port and to the second antenna port; and
a transceiver configured to:
receive one or more synchronization signals on a plurality of beams from a wireless communications device;
transmit the RACH preamble as provided to the first and second antenna ports to the wireless communications device without the RACH payload; and
transmit the RACH payload as provided to the first and second antenna ports to the wireless communications device without the RACH preamble,
wherein the RACH preamble and the RACH payload are beamformed for the transmission based on one or more beams from among the plurality of beams on which the one or more synchronization signals were received.

18. The apparatus of claim 17, wherein:
the transceiver is further configured to transmit the RACH payload as provided to the first and second antenna ports to the wireless communications device after transmission of the RACH preamble as provided to the first and second antenna ports as part of a two-step RACH procedure.

19. The apparatus of claim 18, wherein the transceiver is further configured to:
receive, from the wireless communications device, a message comprising control information, a random access response, and a connection resolution message, the message being in response to both the RACH preamble and the RACH payload and as part of the two-step RACH procedure.

20. The apparatus of claim 18, wherein the processor is further configured to:
provide the RACH preamble as a reference signal to the wireless communications device for use with the RACH payload.

21. The apparatus of claim 18, wherein the processor is further configured to:
determine the one or more beams associated with a direction having a highest signal quality corresponding to the synchronization signals received from the wireless communications device;
use a first symbol from among a plurality of symbols associated with the one or more beams for transmitting the RACH preamble; and
use a second symbol from among the plurality of symbols associated with the one or more beams for transmitting the RACH payload.

22. The apparatus of claim 17, wherein the processor is further configured to:
precode the RACH preamble into a first frequency tone for transmission from a first physical antenna port and a second frequency tone for transmission from a second physical antenna port, the first and second frequency tones being non-overlapping to each other.

23. The apparatus of claim 17, wherein the processor is further configured to:
spread, before the transmission of the RACH preamble, each component of the RACH preamble into two or more tones at both the first and second antenna ports.

24. The apparatus of claim 17, wherein the apparatus and the wireless communication device communicate using millimeter-wave frequencies.

25. An apparatus, comprising:
a transceiver configured to:
transmit one or more synchronization signals on a plurality of beams to a wireless communications device;
receive a random access channel (RACH) preamble from the wireless communications device, the RACH preamble having been conveyed through first and second antenna ports; and
receive a RACH payload from the wireless communications device, the RACH payload having been conveyed through the first and second antenna ports, the RACH preamble and the RACH payload having been beamformed based on one or more beams from among the plurality of beams on which synchronization signals were transmitted; and
a processor configured to:
recover first and second data streams corresponding to the first and second antenna ports for the RACH preamble, and third and fourth data streams corresponding to the first and second antenna ports for the RACH payload; and
determine an identity of the wireless communications device based on the receiving the RACH preamble through the first and second antenna ports and the recovering the first and second data streams.

26. The apparatus of claim 25, wherein:
the RACH preamble is received prior to receiving the RACH payload as part of a two-step RACH procedure; and
the processor is further configured to determine a response message based on recovering the third and fourth data streams.

27. The apparatus of claim 26, wherein the processor is further configured to:
estimate a channel between the apparatus and the wireless communications device based on the RACH preamble functioning as a reference signal.

28. The apparatus of claim 26, wherein the transceiver is further configured to:
transmit, in response to both the RACH preamble and the RACH payload and as part of the two-step RACH procedure, the response message to the wireless communications device, the response message comprising control information, a random access response, and a connection resolution message.

29. The apparatus of claim 26, wherein:
the transceiver is further configured to broadcast the synchronization signals using the plurality of beams,
the RACH preamble is included with a first symbol from among a plurality of symbols associated with the one or more beams, and the RACH payload is included with a second symbol from among the plurality of symbols associated with the one or more beams.

30. The apparatus of claim 25, wherein the processor is further configured to:

decode the RACH preamble from a first frequency tone and a second frequency tone that are non-overlapping to each other.

\* \* \* \* \*